US007733049B2

(12) United States Patent
Hiramoto et al.

(10) Patent No.: US 7,733,049 B2
(45) Date of Patent: Jun. 8, 2010

(54) RAINDROP QUANTITY SENSING APPARATUS AND WIPER CONTROL SYSTEM HAVING THE SAME

(75) Inventors: Satoru Hiramoto, Chita (JP); Taiji Morishita, Kariya (JP)

(73) Assignee: Denso Corporation, Kariya (JP)

( * ) Notice: Subject to any disclaimer, the term of this patent is extended or adjusted under 35 U.S.C. 154(b) by 325 days.

(21) Appl. No.: 11/826,897

(22) Filed: Jul. 19, 2007

(65) Prior Publication Data

US 2008/0030159 A1 Feb. 7, 2008

(30) Foreign Application Priority Data

Aug. 3, 2006 (JP) ............................ 2006-212489

(51) Int. Cl.
*H02P 1/04* (2006.01)

(52) U.S. Cl. ....................... 318/483; 702/3; 73/170.21; 73/170.17

(58) Field of Classification Search ................. 318/483; 702/3; 73/170.21, 170.17
See application file for complete search history.

(56) References Cited

U.S. PATENT DOCUMENTS 5,140,234 A 8/1992 Wallrafen
5,203,207 A * 4/1993 Sugiyama ................ 73/170.17
5,276,388 A 1/1994 Levers
5,276,389 A 1/1994 Levers
5,319,293 A 6/1994 Levers
5,336,980 A 8/1994 Levers
RE35,422 E 1/1997 Levers
5,666,037 A 9/1997 Reime
5,726,547 A 3/1998 Reime
5,847,826 A * 12/1998 Fukui et al. ................. 356/335
6,175,205 B1 1/2001 Michenfelder et al.
6,313,454 B1 * 11/2001 Bos et al. ................. 250/208.1
6,353,392 B1 * 3/2002 Schofield et al. ............ 340/602
6,686,992 B2 2/2004 Wakabayashi et al.
6,768,422 B2 * 7/2004 Schofield et al. ............ 340/602
6,936,985 B2 * 8/2005 Pankey et al. ............... 318/443
7,095,199 B2 * 8/2006 Hirose et al. ................ 318/444

FOREIGN PATENT DOCUMENTS

DE 100 52 342 A1 5/2002
EP 1 199 231 B1 4/2002
JP 2000-085538 3/2000
JP A-2000-085538 3/2000

OTHER PUBLICATIONS

Office Action dated Jul. 8, 2008 in German Application No. 102007000407.0 with English translation.

* cited by examiner

*Primary Examiner*—Walter Benson
*Assistant Examiner*—David S Luo
(74) *Attorney, Agent, or Firm*—Nixon & Vanderhye P.C.

(57) ABSTRACT

A change computing arrangement computing an amount of change in a measured value of a measurement signal of a raindrop sensor in a raindrop quantity sensing execution time period that is a time period, during which a wiper blade moves outside of a sensing range of the raindrop sensor. A difference computing arrangement computes a difference between a predetermined reference value and an initial measured value of the measurement signal of the raindrop sensor. A determining arrangement determines the quantity of raindrops on the windshield based on the amount of change, which is computed by the change computing arrangement, and the difference, which is computed by the difference computing arrangement.

13 Claims, 8 Drawing Sheets

FIG. 11A
RELATED ART
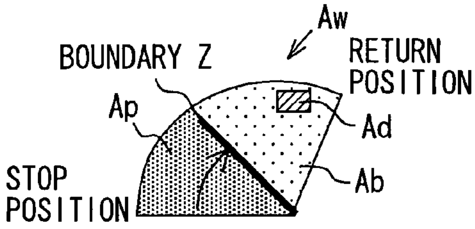
FIG. 11B
RELATED ART
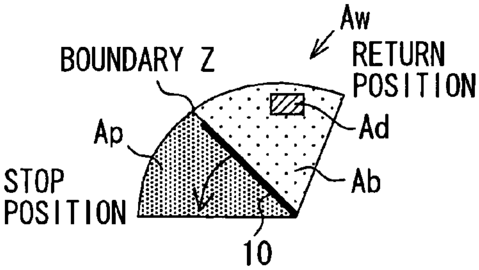
FIG. 12A
RELATED ART
FIG. 12B
RELATED ART
FIG. 12C
RELATED ART
FIG. 12D
RELATED ART
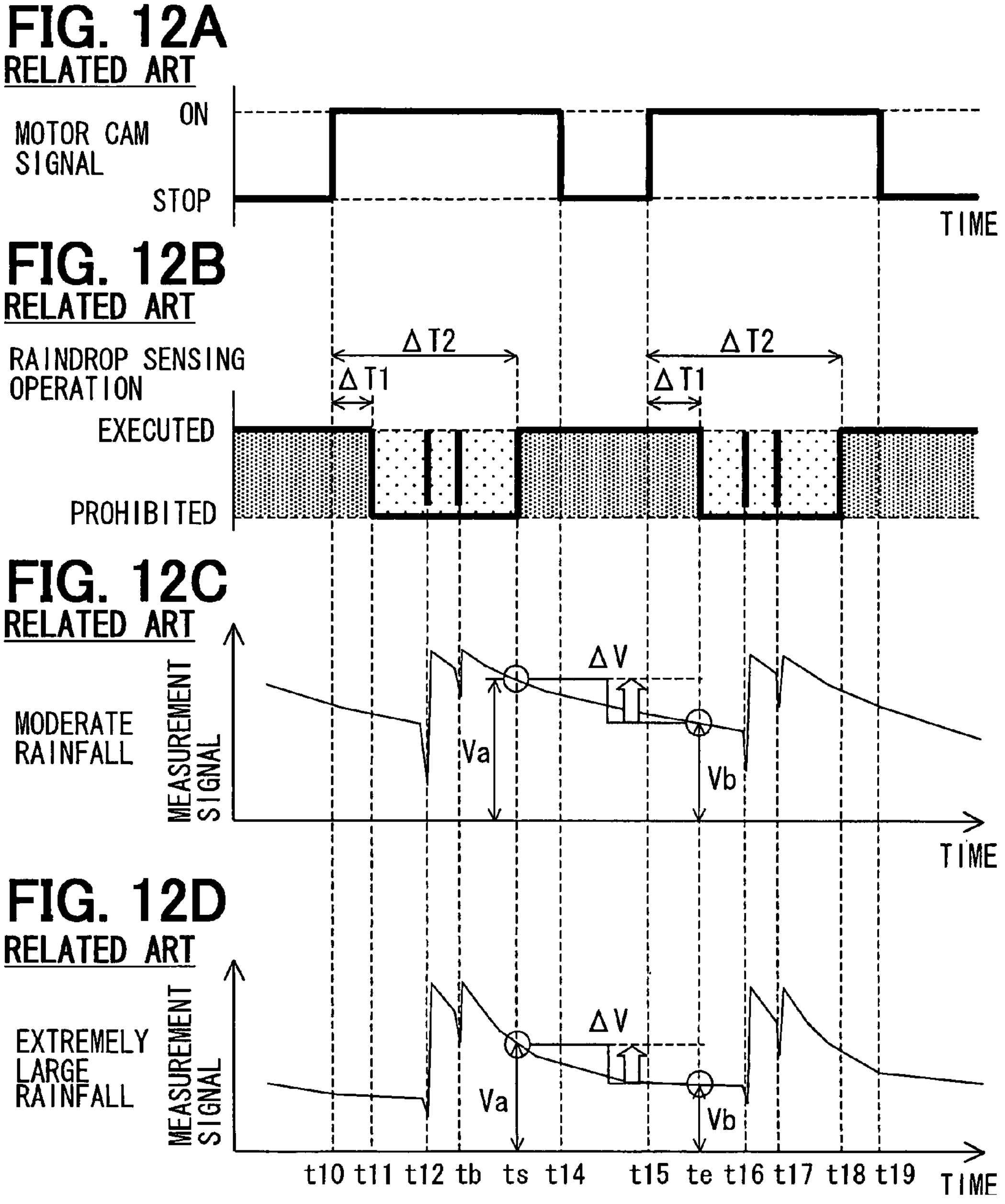

RAINDROP QUANTITY SENSING APPARATUS AND WIPER CONTROL SYSTEM HAVING THE SAME

CROSS REFERENCE TO RELATED APPLICATION

This application is based on and incorporates herein by reference Japanese Patent Application No. 2006-212489 filed on Aug. 3, 2006.

BACKGROUND OF THE INVENTION

1. Field of the Invention

The present invention relates to a raindrop quantity sensing apparatus and a wiper control system having the same.

2. Description of Related Art

In a vehicle, such as an automobile, wiper blades are driven by a wiper motor, so that each of the wiper blades is swung forward from a stop position to a return position and is then swung backward from the return position to the stop position. By repeating the above reciprocal wiping movement of the wiper blades, raindrops on a wiping range of a windshield of the vehicle are wiped.

Japanese Unexamined Patent Publication Number 2000-085538 discloses one such a technique. According to this technique, a quantity of raindrops in a sensing range of a windshield is measured with a raindrop sensor at the time, at which the wiper blade reaches the sensing range, and is thereafter measured with the raindrop sensor once again at the subsequent time, at which the wiper blade reaches the sensing range again. Then, an amount of a change in the quantity of raindrops is computed based on these measurements. Thereafter, a quantity of raindrops, which is measured right before the reaching of the wiper blade to the sensing range, is added to the amount of change. In this way, the quantity of raindrops is measured without a need for providing a raindrop quantity sensing prohibited time period, during which the sensing of the quantity of raindrops with the raindrop sensor is prohibited.

However, when the quantity of raindrops is determined based on the measurement signal of the raindrop sensor, which is obtained while the wiper blade is amid of moving in the sensing range, the state of raindrops in the sensing range may be disturbed by the wiper blade, or the wiped water, which is wiped by the wiper blade and is placed in the sensing range, may be erroneously additionally measured. Thus, in such a case, a quantity of raindrops fell from the sky on the sensing range may not be accurately determined. In view of this, a passing time period, during which the wiper blade moves in the sensing range of the raindrop sensor, is set as a raindrop quantity sensing prohibited time period for prohibiting the sensing of the quantity of raindrops in the sensing range. Also, a time period, during which the wiper blade moves outside of the sensing range, is set as a raindrop quantity sensing execution time period for executing the sensing of the quantity of raindrops in the sensing range. The quantity of raindrops in the sensing range is determined based on the measurement signal of the raindrop sensor, which is outputted in the raindrop quantity sensing execution time period.

FIGS. 11A and 11B show such an example. Here, a range, through which the wiper blade moves during the raindrop quantity sensing execution time period, is set as a raindrop quantity sensing execution range Ap. Also, a range, through which the wiper blade moves during the raindrop quantity sensing prohibited time period, is set as a raindrop quantity sensing prohibited range Ab. The raindrop quantity sensing execution range Ap is separated from the raindrop quantity sensing prohibited range Ab at a boundary Z. In FIGS. 11A and 11B, the raindrop quantity sensing prohibited range Ab includes a range other than the sensing range Ad of the raindrop sensor for the following reason. Specifically, the wiping level of wiper blade 10 may be sequentially changed to the intermittent drive operation at the long intermittent time interval, the intermittent drive operation at the short intermittent time interval, the continuous drive operation at the low wiping speed and the continuous drive operation at the high wiping speed depending on a need. The intermittent time interval and the wiping speed may vary from a vehicle to vehicle regardless of a vehicle model (regardless of the same model or different models). Furthermore, the raindrop sensor is placed in the predetermined location in the windshield. Regardless of the vehicle model, the location of the raindrop sensor may vary. Thus, the wiping speed of the wiper blade 10 and the distance from the stop position to the sensing range Ad of the raindrop sensor may vary from the vehicle to vehicle, so that it is difficult to accurately set the time period, during which the wiper blade 10 moves in the sensing range Ad, as the raindrop quantity sensing prohibited time period. In order to reliably include the time period, during which the wiper blade 10 moves in the sensing range Ad, into the raindrop quantity sensing prohibited time period, and also to tolerate the above variations, the raindrop quantity sensing prohibited time period includes the time period, during which the wiper blade 10 moves outside the sensing range Ad. Thus, the raindrop quantity sensing prohibited range Ab includes the range other than the sensing range Ad of the raindrop sensor.

Now, a sensing principle of the raindrop sensor will be described. The raindrop sensor includes a light emitting device and a light receiving device. The light emitting device may be a light emitting diode, which outputs an infrared light toward the sensing range Ad in the wiping range Aw of the windshield. The light receiving device receives a reflected light, which is outputted from the light emitting device and is reflected from the windshield, and outputs a measurement value, which corresponds to a quantity of the received light. When no raindrop is present in the sensing range Ad, the infrared light, which is outputted from the light emitting device, is substantially entirely reflected by the windshield (total reflection) and is received by the light receiving device. However, when raindrops are present in the sensing range Ad, a portion of the infrared light, which is outputted from the light emitting device, penetrates through the windshield through the raindrops present in the sensing range Ad. Thus, the amount of light, which is received by the light receiving device, is reduced. Specifically, when the quantity of raindrops in the sensing range Ad is reduced, the amount of light, which penetrates through the windshield, is reduced. Thus, in such a case, the measurement signal of the raindrop sensor is increased. In contrast, when the quantity of raindrops in the sensing range Ad is increased, the amount of light, which penetrates through the windshield, is increased. Thus, in such a case, the measurement signal of the raindrop sensor is reduced.

The sensing operation of the raindrop sensor will be now described further with reference to FIGS. 12A to 12D. With reference to FIG. 12A, the wiper motor begins to rotate at the time t10 to swing the wiper blade 10 and is stopped at the time t14. Thereafter, the wiper motor begins to rotate at the time t15 to swing the wiper blade 10 and is stopped at the time t19. In each operating state, i.e., ON-state of the wiper motor (a period between the time t10 and the time t14, a period between the time t15 and the time t19), the wiping range Aw is wiped by the wiper blade 10. In each stop state, i.e., OFF-state of the wiper motor (before the time t10, a period between the time t14 and the time t15, and after the time t19), the wiper blade 10 is stopped in the stop position (FIG. 11).

As shown in FIG. 12B, the wiper blade 10 is moved from the raindrop quantity sensing execution range Ap into the raindrop quantity sensing prohibited range Ab at the time t11 (end of the raindrop quantity sensing execution time period) that is reached after elapse of a predetermined time period ΔT1 from the time t10, at which the wiper motor is shifted from the stop state to the operating state. Then, for example, the wiper blade 10 is swung forward to pass the sensing range Ad at the time t12 and is returned at the return position. Thereafter, the wiper blade 10 is swung backward to pass the sensing range Ad at the time tb once again. Furthermore, the wiper blade 10 is moved from the raindrop quantity sensing prohibited range Ab into the raindrop quantity sensing execution range Ap at the time ts (beginning of the raindrop quantity sensing execution time period), which is reached after elapse of a predetermined time period ΔT2 from the time t10 described above. Similarly, the wiper blade 10 is moved from the raindrop quantity sensing execution range Ap into the raindrop quantity sensing prohibited range Ab at the time te (end of the raindrop quantity sensing execution time period) that is reached after elapse of the predetermined time period ΔT1 from the time t15, at which the wiper motor is shifted from the stop state to the operating state once again. Next, for example, the wiper blade 10 passes the sensing range Ad at the time t16 and is returned at the return position. Then, the wiper blade 10 passes the sensing range Ad at the time t17 once again. Then, the wiper blade 10 is moved from the raindrop quantity sensing prohibited range Ab into the raindrop quantity sensing execution range Ap at the time t18 (beginning of the raindrop quantity sensing execution time period), which is reached after elapse of the predetermined time period ΔT2 from the time t15 described above. The predetermined time period ΔT1 and the predetermined time period ΔT2 are set each time depending on the wiping speed of the wiper blade 10.

FIG. 12C shows the shift of the measurement signal of the raindrop sensor in a state where moderate rain shower (moderate rainfall) exists. As shown in FIG. 12C, the measurement signal, which is outputted from the raindrop sensor, changes with time. Specifically, the quantity of raindrops in the sensing range Ad is increased with time, so that the measurement signal, which is outputted from the raindrop sensor, is gradually reduced. At the time t12, at which the wiper blade 10 passes the sensing range Ad, the scraped water, which is scraped by the wiper blade 10, as well as the adhered water, which is adhered to the wiper blade 10, are brought into the sensing range Ad to cause an increase in the amount of light, which is outputted from the light emitting device and penetrates through the windshield. Thus, the measurement signal of the raindrop sensor largely drops once. Right after the time t12, the sensing range Ad is wiped by the wiper blade 10, so that the amount of light, which is outputted from the light emitting device and penetrates through the windshield, becomes substantially zero. Thus, the measurement signal of the raindrop sensor is largely increased. At the time tb, at which the wiper blade 10 passes the sensing range Ad upon returning from the return position, the scraped water, which is scraped by the wiper blade 10, is relatively small due to the small distance from the return position but causes the decrease of the measurement signal of the raindrop sensor once again. Right after the time tb, the measurement signal of the raindrop sensor is increased to the level, which is the same as that of the time t12. Thereafter, the measurement signal of the raindrop sensor is gradually decreased. Thus, as long as the same level of rain shower exists, the measurement signal of the raindrop sensor basically shows the above shift.

However, when the temperature of the raindrop sensor changes, the above shift may not be maintained in some situations even in the case where the same level of rain shower exits. Specifically, the raindrop sensor has a temperature characteristic of changing the measurement signal thereof due to luminance characteristic of the light emitting device of the raindrop sensor. That is, in the case where the same quantity of raindrops is present in the sensing range Ad, when the temperature decreases, the measurement signal of the raindrop sensor increases, and vice versa. Therefore, even when one-to-one relationship between the quantity of raindrops in the sensing range Ad and the measurement signal of the raindrop sensor is preset, this relationship changes upon changing of the temperature of the raindrop sensor. Thus, it is not possible to accurately determine the quantity of raindrops in the sensing range Ad based directly on the measurement signal received from the raindrop sensor.

Therefore, according to the previously proposed technique, the amount of change ΔV is computed by subtracting the measurement signal Vb of the raindrop sensor at the end (time te) of the raindrop quantity sensing execution time period from the measurement signal Va of the raindrop sensor at the beginning (time ts) of the raindrop quantity sensing execution time period. The quantity of raindrops in the sensing range Ad is determined based on this amount of change ΔV. In this way, even when the temperature of the raindrop sensor is changed, the quantity of raindrops in the sensing range Ad can be determined. The principle of this determination will be described below.

For example, it is assumed that the state of rain is changed from the moderate rain shower to heavy rain shower (large rainfall). In such a case, the quantity of raindrops fell from the sky on the sensing range Ad per unit time is increased. Thus, under the heavy rain shower, the measurement signal Va of the raindrop sensor at the time ts is reduced in comparison to the measurement signal Va of the raindrop sensor at the time ts under the moderate rain shower. Similarly, the measurement signal Vb of the raindrop sensor at the time te under the heavy rain shower is reduced in comparison to the measurement signal Vb of the raindrop sensor at the time te under the moderate rain shower. That is, the measurement signal Va and the measurement signal Vb are both reduced at the time ts and at the time te. In general, the time interval between the time ts and the time te is longer than a time interval between the time tb and the time ts. Thus, when the rainfall is increased, the quantity of raindrops fell from the sky on the sensing range Ad during the time interval between the time ts and the time te is increased in comparison to the quantity of raindrops fell from the sky on the sensing range Ad during the time interval between the time tb and the time ts. When the quantity of raindrops fell from the sky on the sensing range Ad is increased, the measurement signal of the raindrop sensor is reduced. Thus, when the state of rain changes from the moderate rain shower to the heavy rain shower, the amount of decrease in the measurement signal Vb of the raindrop sensor becomes greater than the amount of decrease in the measurement signal Va. In other words, the measurement signal Vb of the raindrop sensor shows the greater decrease in comparison to the measurement signal Va of the raindrop sensor. Thus, when the state of rain changes from the moderate rain shower to the heavy rain shower, the amount of change ΔV in the measurement signal of the raindrop sensor in the raindrop quantity sensing execution time period is increased. The amount of change ΔV in the measurement signal is also increased when the state of rain changes from the no-rain state to light rain shower (small rainfall) or changes from the small rain shower to the moderate rain shower.

Now, for example, it is assumed that the state of rain is changed from the moderate rain shower to the light rain shower (small rainfall). In such a case, the quantity of raindrops fell from the sky on the sensing range Ad per unit time is decreased. Thus, under the light rain shower, the measurement signal Va of the raindrop sensor at the time ts is increased in comparison to the measurement signal Va of the raindrop sensor at the time ts under the moderate rain shower. Similarly, the measurement signal Vb of the raindrop sensor at the time te under the light rain shower is increased in comparison to the measurement signal Vb of the raindrop sensor at the time te under the moderate rain shower. That is, the measurement signal Va and the measurement signal Vb are both increased at the time ts and at the time te. In general, the time interval between the time ts and the time te is longer than the time interval between the time tb and the time ts. Thus, when the rainfall is decreased, the quantity of rain not fell from the sky on the sensing range Ad between the time interval between the time ts and the time te is increased in comparison to the quantity of rain not fell from the sky on the sensing range Ad in the time interval between the time tb and the time ts. In other words, the measurement signal Vb of the raindrop sensor shows the greater increase in comparison to the measurement signal Va of the raindrop sensor. Thus, when the state of rain changes from the moderate rain shower to the light rain shower, the amount of change ΔV in the measurement signal of the raindrop sensor in the raindrop quantity sensing execution time period is decreased. The amount of change ΔV in the measurement signal is also decreased when the state of rain changes from the heavy rain shower to the moderate rain shower or changes from the small rain shower to the no-rain state.

Furthermore, although the time interval between the time ts and the time te is relatively long, it is not long enough to cause a substantial change in the temperature of the raindrop sensor. Thus, the temperature Ta of the raindrop sensor at the time ts can be considered as generally the same temperature as the temperature Tb of the raindrop sensor at the time te. Therefore, according to the previously proposed technique, regardless of the temperature of the raindrop sensor, whenever the amount of change ΔV in the measurement signal of the raindrop sensor in the raindrop quantity sensing execution time period is increased, it is determined that the rainfall is increased. Thus, the wiping level of the wiper blade 10 is increased. In contrast, whenever the amount of change ΔV in the measurement signal of the raindrop sensor in the raindrop quantity sensing execution time period is reduced, it is determined that the rainfall is reduced. Thus, the wiping level of the wiper blade 10 is reduced.

When the rainfall is shifted in the order of the small rainfall, the moderate rainfall and the large rainfall and is thereafter increased to an extremely large rainfall, the following disadvantage is encountered. FIG. 12D shows the shift of the measurement signal of the raindrop sensor in the case of the extremely large rainfall.

Specifically, at the time of the extremely large rainfall, the amount of raindrops fell from the sky on the sensing range Ad per unit time is extremely large. Thus, the measurement signal Va of the raindrop sensor at the time ts under extremely heavy rainfall becomes smaller than the measurement signal Va of the raindrop sensor at the time ts under the large rainfall. However, the measurement signal Vb of the raindrop sensor at the time te under the extremely heavy rainfall is not significantly reduced in comparison to the measurement signal Vb of the raindrop sensor at the time te under the large rainfall. That is, at the time of the extremely large rainfall, the entire surface area of the sensing range Ad is quickly covered with the large quantity of raindrops between the time tb and the time ts. Thus, even when the raindrops are kept applied to the sensing range Ad, the amount of light, which is outputted from the light emitting device and penetrates through the windshield, cannot increase largely from the time ts to the time te. Therefore, in the case where the state of rain is changed from the heavy rain shower (the heavy rainfall) to the extremely heavy rain shower (the extremely heavy rainfall), although the measurement signal Va and the measurement signal Vb are reduced at the time ts and the time te, respectively, the measurement signal Va shows the greater degrease in comparison to the measurement signal Vb. Thus, the amount of change ΔV in the measurement signal of the raindrop sensor in the raindrop quantity sensing execution time period becomes small. Therefore, according to the previously proposed technique, which uses the amount of change ΔV in the measurement signal of the raindrop sensor in the raindrop quantity sensing execution time period, it is not possible to distinguish the shifting of the rainfall in the order of the large rainfall, the moderate rainfall, the small rainfall and no rainfall from the shifting of the rainfall from the large rainfall to the extremely large rainfall. In such a case, the wiping level of the wiper blade 10 could possibly be reduced at the time of the extremely heavy rainfall where the highest wiping level of the wiper blade 10 is required.

SUMMARY OF THE INVENTION

The present invention addresses the above disadvantage. Thus, it is an objective of the present invention to provide a raindrop quantity sensing apparatus and a wiper control system having the same, which enable more appropriately determination of a quantity of raindrops on a windshield of a vehicle.

To achieve the objective of the present invention, there is provided a raindrop quantity sensing apparatus, which includes a raindrop sensor, a change computing means, a difference computing means and a determining means. The raindrop sensor outputs a measurement signal, which corresponds to a quantity of raindrops in a predetermined area in a wiping range of a wiper blade on a windshield. The change computing means is for computing an amount of change in a measured value of the measurement signal of the raindrop sensor in a raindrop quantity sensing execution time period. The change computing means sets a time period, during which the wiper blade moves in a sensing range of the raindrop sensor, as a raindrop quantity sensing prohibited time period, and the change computing means sets a time period, during which the wiper blade moves outside of the sensing range, as a raindrop quantity sensing execution time period. The difference computing means is for computing a difference between a predetermined reference value and an initial measured value of the measurement signal of the raindrop sensor, wherein the initial measured value of the measurement signal of the raindrop sensor is measured at a beginning of the raindrop quantity sensing execution time period. The determining means is for determining the quantity of raindrops on the windshield based on the amount of change, which is computed by the change computing means, and the difference, which is computed by the difference computing means.

To achieve the objective of the present invention, there is also provided a wiper control system, which includes the raindrop quantity sensing apparatus, a wiper motor and a wiper control means. The wiper motor drives the wiper blade. The wiper control means is for controlling a wiping operation of the wiper blade according to the quantity of raindrops on the windshield, which is determined by the raindrop quantity sensing apparatus.

BRIEF DESCRIPTION OF THE DRAWINGS

The invention, together with additional objectives, features and advantages thereof, will be best understood from the following description, the appended claims and the accompanying drawings in which:

FIG. 11A is a diagram showing a state of a wiper blade moving from a raindrop quantity sensing execution range to a raindrop quantity sensing prohibited range;

FIG. 11B is a diagram showing a state of the wiper blade moving from the raindrop quantity sensing prohibited range to the raindrop quantity sensing execution range;

FIG. 12A is a timing chart showing a state of a wiper motor of a previously proposed wiper control system;

FIG. 12B is a timing chart showing a transition in the raindrop quantity sensing execution time period and a transition in the raindrop quantity sensing prohibited time period in the previously proposed wiper control system;

FIG. 12C is a timing chart showing a relationship between a measurement signal of a raindrop sensor and time in the previously proposed wiper control system in a case of moderate rain shower; and FIG. 12D is a timing chart showing a relationship between a measurement signal of a raindrop sensor and time in the previously proposed wiper control system in a case of extremely heavy rain shower.

DETAILED DESCRIPTION OF THE INVENTION

A raindrop quantity sensing apparatus and a wiper control system having the same according to an embodiment of the present invention will be described with reference to FIGS. 1 to 9B.

Figure 1:
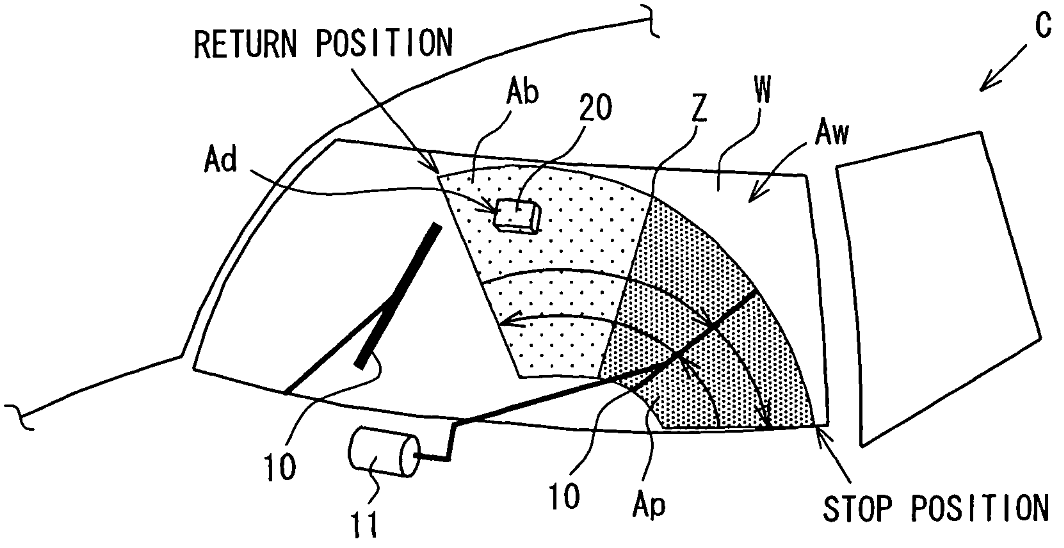
FIG. 1 is a schematic diagram showing a raindrop quantity sensing apparatus and a wiper control system having the same according to an embodiment of the present invention.
Figure 2:
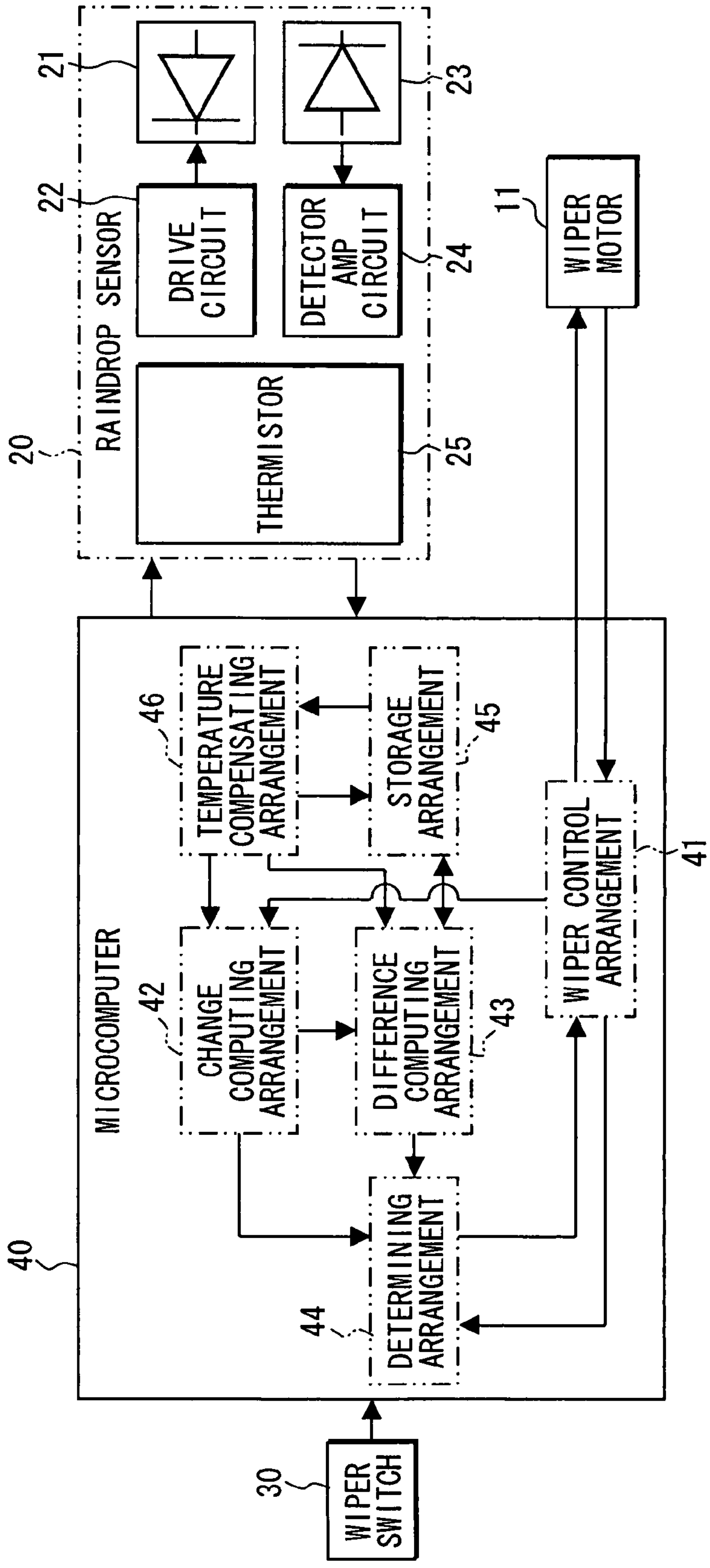
FIG. 2 is a block diagram showing an entire structure of the wiper control system.

With reference to FIGS. 1 and 2, the wiper control system of the present embodiment includes a wiper motor 11, a raindrop sensor 20, a wiper switch 30 and a microcomputer 40. The wiper motor 11 drives wiper blades 10 to reciprocally swing over and thereby to wipe a windshield W of a vehicle (a moving object) C, such as an automobile. The raindrop sensor 20 and the microcomputer 40 cooperate together to form the raindrop quantity sensing apparatus. The raindrop sensor 20 optically senses a quantity of raindrops, which adhere to, i.e., are present in a predetermined sensing range Ad of the windshield W. A user of the vehicle C selects a wiping pattern of the wiper blades 10 through the wiper switch 30. The microcomputer 40 executes, for example, a wiper control operation for controlling the wiper motor 11 based on information of the quantity of raindrops received from the raindrop sensor 20 and information of the wiping pattern received from the wiper switch 30.

Specifically, with reference to FIG. 1, a drive force of the wiper motor 11 is transmitted to the wiper blades 10 through a transmission mechanism of a well known type (e.g., a link mechanism). In FIG. 1, for the sake of simplicity, the transmission mechanism is simplified. As a result, each wiper blade 10 is swung from a stop position to a return position and is then swung back from the return position to the stop position. Thus, the wiper blade 10 wipes a wiping range Aw, which is defined between the stop position and the return position on the windshield W. As shown in FIG. 1, the wiping range Aw of the wiper blade 10 has a fan shape.

As shown in FIG. 1, the raindrop sensor 20 is placed at a top center location of the windshield W of the vehicle C. More specifically, the raindrop sensor 20 is placed on a vehicle passenger compartment side of the windshield W at the location near a room mirror, i.e., a rearview mirror (not shown).

As shown in FIG. 2, the raindrop sensor 20 includes a light emitting device 21 and a light receiving device 23. The light emitting device 21 may be a light emitting diode, which outputs an infrared light toward the sensing range Ad of the windshield W. The light receiving device 23 receives a reflected light, which is outputted from the light emitting device 21 and is reflected from the windshield W, and outputs a measurement value, which corresponds to a quantity of the received light. Furthermore, as shown in FIG. 2, the light emitting device 21 is connected to the microcomputer 40 through a light emitting device drive circuit 22, so that turning on and turning off of the light emitting device 21 are controlled by the microcomputer 40. Furthermore, as shown in FIG. 2, the light receiving device 23 is connected to the microcomputer 40 through a detector and amplifier circuit 24 to output a measurement signal, which corresponds to the sensed quantity of raindrops, to the microcomputer 40. With the above described configuration, when no raindrop is present in the sensing range Ad, the infrared light, which is outputted from the light emitting device 21, is substantially entirely reflected by the windshield W and is received by the light receiving device 23. However, when raindrops are present in the sensing range Ad, a portion of the infrared light, which is outputted from the light emitting device 21, penetrates through the windshield W through the raindrops present in the sensing range Ad. Thus, the quantity of light received by the light receiving device 23 is decreased. Therefore, the quantity of raindrops in the sensing range Ad is optically sensed based on the relationship between the quantity of raindrops in the sensing range Ad and the quantity of light received by the light receiving device 23.

Also, as shown in FIG. 2, the raindrop sensor 20 includes a thermistor 25, which serves as a temperature sensing means for sensing a temperature of the raindrop sensor 20. The reason for providing the thermistor 25 will be described below. Even when the same quantity of raindrops is present in the sensing range Ad of the windshield W, the measurement signal of the raindrop sensor 20 may vary due to luminance characteristic of the light emitting device 21, which change depending on the temperature. Specifically, in the case where the same quantity of raindrops is present in the sensing range Ad, when the temperature decreases, the measurement signal of the raindrop sensor 20 increases, and vice versa. Therefore, even when one-to-one relationship between the quantity of raindrops in the sensing range Ad and the measurement signal of the raindrop sensor 20 is preset, this relationship changes upon changing of the temperature of the raindrop sensor 20. Thus, it is not possible to accurately determine the quantity of raindrops in the sensing range Ad based directly on the measurement signal received from the raindrop sensor 20. As a result, it is required to sense the temperature of the raindrop sensor 20 and to temperature compensate the measurement signal of the raindrop sensor 20 based on the sensed temperature of the raindrop sensor 20 to implement the accurate measurement of the quantity of raindrops in the sensing range Ad. The thermistor 25 is of a well know type, so that the description of the thermistor 25 is omitted for the sake of simplicity. The temperature compensation of the measurement signal of the raindrop sensor 20 will be described in detail below.

The user of the vehicle C can manually operate the wiper switch 30 to one of a wiping stop position (an OFF mode), an automatic control position (an AUTO mode), a low speed wiping position (a LO mode) and a high speed wiping position (a HI mode). The wiper switch 30 may be rotated to a corresponding one of the four positions to execute the corresponding operational mode. When the corresponding one of the operational modes is selected, the wiper switch 30 outputs information of the selected operational mode to the microcomputer 40.

The microcomputer 40 includes a CPU, a storage device, an input circuit, an output circuit and a power supply circuit. The CPU executes control operations and computing operations. The storage device includes a read only memory (ROM) for storing various programs and data as well as a random access memory (RAM). The input circuit may include an A/D converter. In this embodiment, functional arrangements of the microcomputer 40 for implementing the various operations of the wiper control system will be schematically described. These functional arrangements include a wiper control arrangement 41, a change computing arrangement 42, a difference computing arrangement 43, a determining arrangement 44, a storage arrangement 45 and a temperature compensating arrangement 46. The wiper control arrangement 41 controls the drive operation of the wiper blades 10 through the wiper motor 11. The change computing arrangement 42 computes the amount of change in the measurement signal of the raindrop sensor 20 during a raindrop quantity sensing execution time period (described below) for measuring the quantity of raindrops. The difference computing arrangement 43 computes a difference between a predetermined reference value and the measurement signal (an initial measured value of the measurement signal) of the raindrop sensor 20 at the beginning of the raindrop quantity sensing execution time period, which is set to measure the quantity of raindrops. The determining arrangement 44 determines the quantity of raindrops in the sensing range Ad. The storage arrangement 45 stores data, which includes the information with respect to the temperature characteristic of the measurement signal of the raindrop sensor 20. The temperature compensating arrangement 46 temperature compensates the measurement signal of the raindrop sensor 20.

The wiper control arrangement 41 receives information of a current rainfall state from the determining arrangement 44 and information of the selected wiping mode from the wiper switch 30 and drives the wiper motor 11 based on them.

Specifically, when the user selects the OFF mode, it can be assumed that raindrops are not present on the windshield W, or the user is not willing to operate the wiper blades 10 due to an ignorable quantity of raindrops on the windshield W. Thus, in such a case, the wiper control arrangement 41 does not supply the electric power to the wiper motor 11. In contrast, when the user selects the LO mode, it can be assumed that a relatively small quantity of raindrops is present on the windshield W, and the user is willing to operate the wiper blades 10 to wipe the raindrops on the windshield W. In such a case, the wiper control arrangement 41 supplies the electric power to the wiper motor 11 to operate the wiper blades 10 at a predetermined speed (a low speed). Furthermore, when the user selects the HI mode, it can be assumed that a relatively large quantity of raindrops is present on the windshield W, and the user is willing to operate the wiper blades 10 to wipe the raindrops on the windshield W. In such a case, the wiper control arrangement 41 supplies the electric power to the wiper motor 11 to operate the wiper blades 10 at a predetermined speed (a high speed).

Furthermore, when the user selects the AUTO mode, it can be assumed that the user is willing to execute the automatic control operation of the wiper blades 10. Thus, the wiper control arrangement 41 receives the information of the current rainfall state from the determining arrangement 44 and executes a suitable wiping operation of the wiper blades 10, which is suitable for the current rainfall, if required. That is, when the wiping operation of the wiper blades 10 is not required, the wiper control arrangement 41 does not supply the electric power to the wiper motor 11 like in the case of the OFF mode. In contrast, when the wiping operation of the wiper blades 10 is required, the wiper control arrangement 41 executes one of, for example, an intermittent drive operation at a long intermittent time interval (e.g., 7 seconds), an intermittent drive operation at a short intermittent time interval (e.g., 3.3 seconds), a continuous drive operation at a wiping speed set for the LO mode, a continuous drive operation at an intermediate wiping speed and a continuous drive operation at a wiping speed set for the HI mode based on the quantity of raindrops in the sensing range Ad. Here, it should be noted that the continuous drive operation at the intermediate wiping speed is the continuous drive operation at the intermediate wiping speed between the wiping speed set for the LO mode and the wiping speed set for the HI mode. Even in the continuous drive operation at the intermediate wiping speed, there are implemented multiple wiping levels.

When the quantity of raindrops in the sensing range Ad is determined based on the measurement signal of the raindrop sensor 20, which is obtained while the wiper blade 10 is amid of moving in the sensing range Ad, the state of raindrops in the sensing range Ad may be disturbed by the wiper blade 10, or the wiped water, which is wiped by the wiper blade 10 and is placed in the sensing range Ad, may be erroneously additionally measured. Thus, in such a case, the quantity of raindrops fell from the sky on the sensing range Ad may not be accurately determined.

Because of the above reason, the change computing arrangement 42 obtains information of whether the wiper motor 11 is in an operating state (ON-state) or in a stopped state (OFF-state). Also, at the same time, the change computing arrangement 42 obtains the measurement signal of the raindrop sensor 20, which may be temperature compensated by the temperature compensating arrangement 46 depending on a need. A passing time period, during which the wiper blade 10 moves in the sensing range Ad of the raindrop sensor 20, is set as a raindrop quantity sensing prohibited time period for prohibiting the sensing of the quantity of raindrops in the sensing range Ad. Also, a time period, during which the wiper blade 10 moves outside of the sensing range Ad, is set as the raindrop quantity sensing execution time period for executing the sensing of the quantity of raindrops in the sensing range Ad. The change computing arrangement 42 computes the amount of change in the measurement signal of the raindrop sensor 20 during the raindrop quantity sensing execution time period.

Specifically, as shown in FIG. 1, the change computing arrangement 42 sets a range, through which the wiper blade 10 moves during the raindrop quantity sensing execution time period, as a raindrop quantity sensing execution range AR Also, the change computing arrangement 42 sets a range, through which the wiper blade 10 moves during the raindrop quantity sensing prohibited time period, as a raindrop quantity sensing prohibited range Ab. The raindrop quantity sensing execution range AP and the raindrop quantity sensing prohibited range Ab are separated at a boundary Z. In FIG. 1, the raindrop quantity sensing prohibited range Ab includes a range other than the sensing range Ad of the raindrop sensor 20 for the following reason. Specifically, the wiping level of wiper blade 10 may be sequentially changed to the intermittent drive operation at the short intermittent time interval, the intermittent drive operation at the long intermittent time interval, the continuous drive operation at the low wiping speed and the continuous drive operation at the high wiping speed depending on a need. The intermittent time interval and the wiping speed may vary from a vehicle to vehicle regardless of a vehicle model (regardless of the same model or different models). Furthermore, the raindrop sensor 20 is placed in the predetermined location in the windshield W. Regardless of the vehicle model, the location of the raindrop sensor may vary. Thus, the wiping speed of the wiper blade 10 and the distance from the stop position to the sensing range Ad of the raindrop sensor 20 may vary from the vehicle to vehicle, so that it is difficult to accurately set the time period, during which the wiper blade 10 moves in the sensing range Ad, as the raindrop quantity sensing prohibited time period. In order to reliably include the time period, during which the wiper blade 10 moves in the sensing range Ad, into the raindrop quantity sensing prohibited time period, and also to tolerate the above variations, the raindrop quantity sensing prohibited time period includes a portion of the time period, during which the wiper blade 10 moves outside the sensing range Ad. Thus, the raindrop quantity sensing prohibited range Ab includes the range other than the sensing range Ad of the raindrop sensor 20. The raindrop quantity sensing execution time period and the raindrop quantity sensing prohibited time period are set for the measurement signal of the raindrop sensor 20 in the above described manner. Then, the change computing arrangement 42 outputs information of the amount of change in the measurement signal of the raindrop sensor 20 during the raindrop quantity sensing execution time period to the determining arrangement 44.

As shown in FIG. 2, the difference computing arrangement 43 obtains the information of whether it is in the raindrop quantity sensing execution time period and also the information of whether raindrops are present in the sensing range Ad from the change computing arrangement 42. Also, the difference computing arrangement 43 obtains the measurement signal of the raindrop sensor 20 (more specifically, the measurement signal after the temperature compensation) from the temperature compensating arrangement 46. Furthermore, when the difference computing arrangement 43 determines that no raindrop is present in the sensing range Ad based on the information obtained from the change computing arrangement 42, the difference computing arrangement 43 stores the measurement signal (measured value of the measurement signal) of the raindrop sensor 20, which is obtained from the temperature compensating arrangement 46, into the storage arrangement 45. That is, the measurement signal (measured value of the measurement signal) of the raindrop sensor 20, which is measured at the time of absence of raindrop(s) in the sensing range Ad and is stored in the storage arrangement 45, is renewed. Specifically, the predetermined reference value stored in the storage arrangement 45 is renewed when no raindrop is present in the sensing range Ad (serving as a renewing means). Then, when the difference computing arrangement 43 determines that it is the beginning of the raindrop quantity sensing execution time period based on the information obtained from the change computing arrangement 42, the difference computing arrangement 43 retrieves the measurement signal (the predetermined reference value) of the raindrop sensor 20 from the storage arrangement 45 and subtracts the current measurement signal (initial measured value of the measurement signal) of the raindrop sensor 20 from the predetermined reference value to obtain the difference. The difference, which is computed by the difference computing arrangement 43, is then outputted to the determining arrangement 44.

The determining arrangement 44 obtains the amount of change in the measurement signal of the raindrop sensor 20 from the change quantity computing arrangement and monitors an increasing/decreasing tendency in the amount of change in the measurement signal of the raindrop sensor 20. Furthermore, the determining arrangement 44 obtains the difference between the predetermined reference value and the current measurement signal of the raindrop sensor 20 from the difference computing arrangement 43 and monitors an increasing/decreasing tendency in the amount of change in the difference. Then, the determining arrangement 44 determines the quantity of raindrops on the windshield W based on the increasing/decreasing tendency in the amount of change and the increasing/decreasing tendency in the difference described above. The determination of the quantity of raindrops will be described latter.

The temperature compensating arrangement 46 obtains the information of the temperature at the time of obtaining the measurement signal of the raindrop sensor 20 and the information of the temperature characteristic of the measurement signal of the raindrop sensor 20 from the thermistor 25 and the storage arrangement 45. Then based on them, the temperature compensating arrangement 46 corrects corresponding one or more of the predetermined reference value, the measurement signal (initial measured value of the measurement signal) of the raindrop sensor 20 at the beginning of the raindrop quantity sensing execution time period and the measurement signal (last measured value of the measurement signal) of the raindrop sensor 20 at the end of the raindrop quantity sensing execution time period in such a manner that these values are obtained under the same temperature basis. In other words, each of the corresponding one or more of the predetermined reference value, the initial measured value of the measurement signal of the raindrop sensor 20 and the last measured value of the measurement signal of the raindrop sensor 20 is corrected to a corresponding value that is supposed to be achieved at a common temperature of the raindrop sensor 20 that is common to a temperature of the raindrop sensor 20, which is measured by the thermistor 25 at a time of measuring the rest of the predetermined reference value, the initial measured value of the measurement signal of the raindrop sensor 20 and the last measured value of the measurement signal of the raindrop sensor 20. The temperature compensation will be described further latter.

Figure 3:
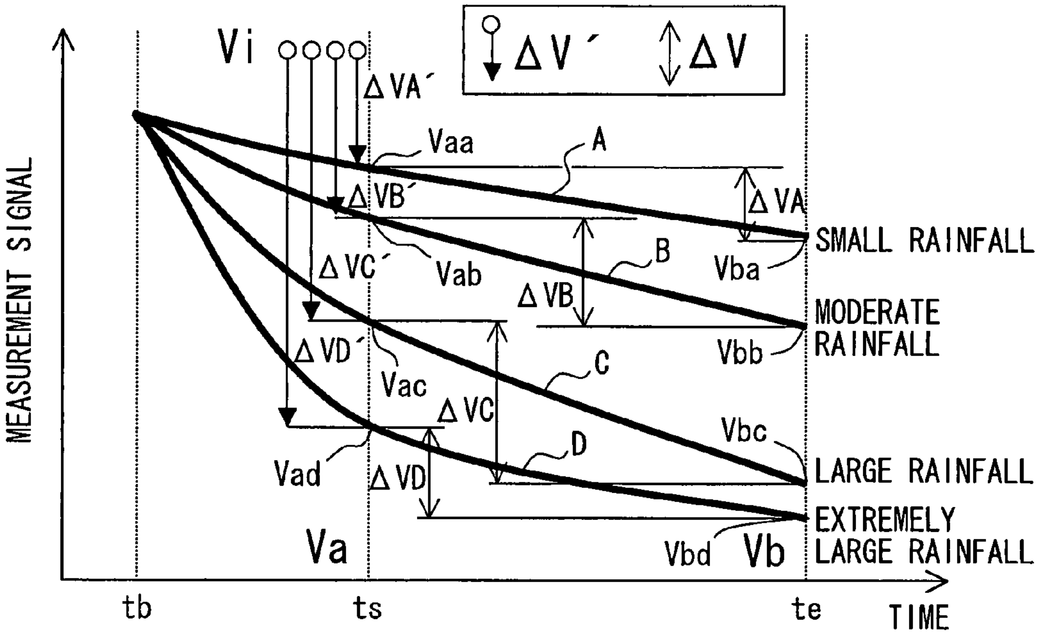
FIG. 3 is a diagram showing a change in a measurement signal of a raindrop sensor of the raindrop quantity sensing apparatus with time.

Now, a principle for determining the quantity of raindrops in the sensing range Ad of the raindrop sensor 20 by the determining arrangement 44 will be described with reference to FIGS. 3 and 4. FIG. 3 shows a change in the measurement signal of the raindrop sensor 20 with time under the same temperature for various different quantities of raindrops. Here, with respect to FIG. 3, it is assumed that the wiper blade 10 is moved forward from the stop position to the return position (a forward stroke) and is then moved backward from the return position to the stop position (a return stroke), and this is repeated. With reference to FIG. 3, the time tb is the time at which the wiper blade 10 is passing the sensing range Ad of the raindrop sensor 20 in the forward stroke of the wiper blade 10. The time ts is the time, at which the wiper blade 10 is just moved from the raindrop quantity sensing prohibited range Ab to the raindrop quantity sensing execution range Ap in the return stroke of the wiper blade 10. That is, the time ts is the beginning of the raindrop quantity sensing execution time period. Furthermore, the time te is the time, at which the wiper blade 10 is just moved from the raindrop quantity sensing execution range Ap into the raindrop quantity sensing prohibited range Ab in the forward stroke of the wiper blade 10. That is, the time te is the end of the raindrop quantity sensing execution time period.

Upon the above assumption, with reference to FIG. 3, at the time of light rain shower (a small rainfall), the measurement signal of the raindrop sensor 20 may shift in a manner shown with a curve A. Here, the measurement signal of the raindrop sensor 20 shows the largest value right after the time tb, which is right after the wiping of the sensing range Ad by the wiper blade 10, and then generally linearly decreases with time. At the time of moderate rain shower (a moderate rainfall), the measurement signal of the raindrop sensor 20 may shift in a manner shown with a curve B. Here, the measurement signal of the raindrop sensor 20 shows the largest value right after the time tb, which is right after the wiping of the sensing range Ad by the wiper blade 10, and then generally linearly decreases with time at a greater rate, which is greater than that of the curve A. At the time of heavy rain shower (a large rainfall), the measurement signal of the raindrop sensor 20 may shift in a manner shown with a curve C. Here, the measurement signal of the raindrop sensor 20 shows the largest value right after the time tb, which is right after the wiping of the sensing range Ad by the wiper blade 10, and then generally linearly decreases with time at a greater rate, which is greater than that of the curve B.

Furthermore, at the time of extremely heavy rain shower (an extremely large rainfall, which occurs after shifting from the small rainfall, the moderate rainfall and the large rainfall), the measurement signal of the raindrop sensor 20 may shift in a manner shown with a curve D. The curve D shows characteristics, which are different from those of the curves A to C. That is, the measurement signal of the raindrop sensor 20 decreases rapidly from the time tb to the time ts and then decreases lightly. This is due to the following reason. That is, at the time of the extremely large rainfall, the entire surface area of the sensing range Ad is quickly covered with the large quantity of raindrops between the time tb, which is right after the wiping of the sensing range Ad of the raindrop sensor 20, and the time ts, which is the beginning of the raindrop quantity sensing execution time period. Since the entire surface area of the sensing range Ad is already covered with the large quantity of raindrops, the amount of light, which is outputted from the light emitting device 21 and penetrates through the windshield W, cannot increase largely from the time ts, which is the beginning of the raindrop quantity sensing execution time period, to the time te, which is the end of the raindrop quantity sensing execution time period. Thus, the measurement signal of the raindrop sensor 20 does not decrease quickly.

When the rainfall changes from the small rainfall (small quantity of raindrops), the moderate rainfall (moderate quantity of raindrops), the large rainfall (large quantity of raindrops) and the extremely large rainfall (extremely large quantity of raindrops), the measurement signal of the raindrop sensor 20 at the time ts shows a relationship of "Vaa>Vab>Vac>Vad" for the curves A to D. Furthermore, the measurement signal of the raindrop sensor 20 at the time te shows a relationship of "Vba>Vbb>Vbc>Vbd" for the curves A to D. These relationships coincide with the relationship of the degrees (small, moderate, large, extremely large) of the rainfall. However, due to differences in the amount of decrease in the measurement signal of the raindrop sensor 20, the amount of change between the measurement signal Vaa-Vad and the measurement signal Vba-Vbd for the respective curves A to D, i.e., the amount of change ΔVA, ΔVB, ΔVC, ΔVD in the measurement signal of the raindrop sensor 20 for the respective curves A to D in the raindrop quantity sensing execution time period shows a relationship of "ΔVC>ΔVB>ΔVD>ΔVA", as shown in FIG. 3. This relationship of "ΔVC>ΔVB>ΔVD>ΔVA" differs from the relationship of the degrees (small, moderate, large, extremely large) of rainfall.

However, when each difference ΔVA', ΔVB', ΔVC', ΔVD' is obtained by subtracting the measurement signal Va (Vaa to Vad) of the respective curves A to D from the reference value Vi, which is the measurement signal of the raindrop sensor 20 outputted in the absence of raindrop(s) in the sensing range Ad and is measured at the generally the same temperature as that of the time of obtaining the measurement signal Va (Vaa to Vad), these differences ΔVA', ΔVB', ΔVC', ΔVD' show a relationship of ΔVD'>ΔVC'>ΔVB'>ΔVA', as shown in FIG. 3. This relationship coincide with the relationship of the degrees (small, moderate, large, extremely large) of the rainfall.

Thus, according to the present embodiment, the quantity of raindrops in the sensing range Ad is determined through use of both of the amount of change ΔV and the difference ΔV'.

Figure 4A:
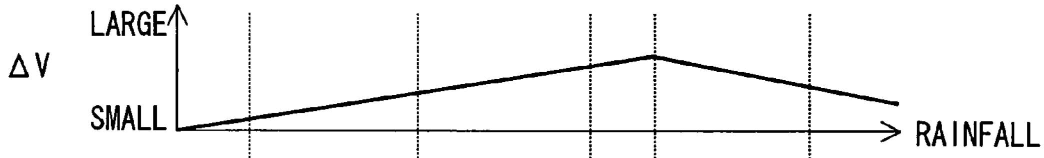
FIG. 4A is a diagram showing an amount of change in a measurement signal of the raindrop sensor in view of a quantity of raindrops (rainfall)
Figure 4B:
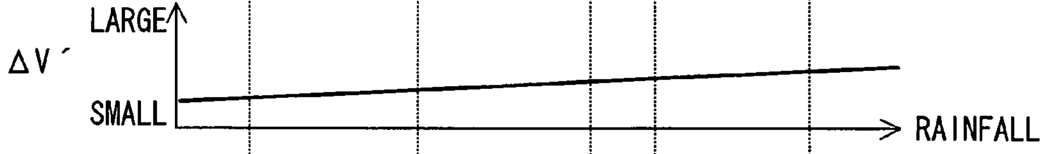
FIG. 4B is a diagram showing a difference between the measurement signal of the raindrop sensor and a reference value in view of the quantity of raindrops (rainfall)
Figure 4C:
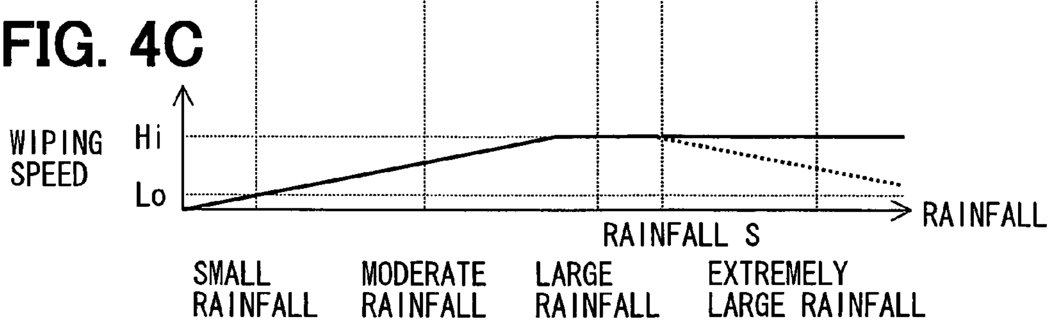
FIG. 4C is a diagram showing a wiping speed of a wiper blade of the wiper control system in view of the quantity of raindrops (rainfall)

FIG. 4A shows the shift of the amount of change ΔV caused by the change in the rainfall. FIG. 4B shows the shift of the difference ΔV' caused by the change in the rainfall. FIG. 4C shows the shift of the wiping speed of the wiper blade 10, which is controlled based on the shift of the amount of change ΔV and the shift of the difference ΔV'.

As shown in FIG. 4A, the amount of change ΔV in the measurement signal of the raindrop sensor 20 in the raindrop quantity sensing execution time period is linearly increased as the quantity of raindrops in the sensing range Ad of the raindrop sensor 20 increases. However, when the rainfall exceeds a rainfall (a predetermined quantity) S and thereby becomes the extremely large rainfall after increasing of the rainfall in the order of the small rainfall, the moderate rainfall and the large rainfall, the measurement signal of the raindrop sensor 20 at the end of the raindrop quantity sensing execution time period reaches a lower limit value of the measurement signal, which is suppliable from the raindrop sensor 20, i.e., which can be outputted from the raindrop sensor 20. Thereby, the amount of change ΔV decreases upon further increasing of the rainfall beyond the rainfall S. Therefore, according to the previously proposed technique, in which the wiping speed of the wiper blade 10 is controlled based solely on the shift of the amount of change ΔV, when the rainfall exceeds the rainfall S, it is erroneously determined that the rainfall is decreased. Thus, the wiping speed (the wiping level) of the wiper blade 10 is erroneously decreased.

In contrast, as shown in FIG. 4B, at the beginning of the raindrop quantity sensing execution time period, the difference ΔV', which is obtained by subtracting the measurement signal Va of the raindrop sensor 20 from the reference value Vi, linearly increases upon increasing of the quantity of raindrops in the sensing range Ad of the raindrop sensor 20. As shown in FIG. 4B, the shift of the difference ΔV' is different from the shift of the amount of change ΔV. Specifically, the difference ΔV' increases even when the, rainfall (the quantity of raindrops in the sensing range Ad) exceeds the rainfall S. Thus, in the state where the amount of change ΔV shows the decreasing tendency while the difference ΔV' shows the increasing tendency, the determining arrangement 44 can determine that the quantity of raindrops in the sensing range Ad is reached to the level greater than the rainfall S, i.e., the determining arrangement 44 can determine that the quantity of raindrops in the sensing range Ad (rainfall) is extremely large. Furthermore, when the wiper control arrangement 41 receives the information, which indicates the quantity of raindrops in the sensing range Ad is extremely large, from the determining arrangement 44, the wiper control arrangement 41 can forcefully set the wiping level of the wiper blades 10 to the continuous drive operation at the wiping speed set for the HI mode.

Next, the temperature compensation, which is performed by the temperature compensating arrangement 46 on the measurement signal of the raindrop sensor 20, will be described with reference to FIGS. 5 to 7.

Figure 5:
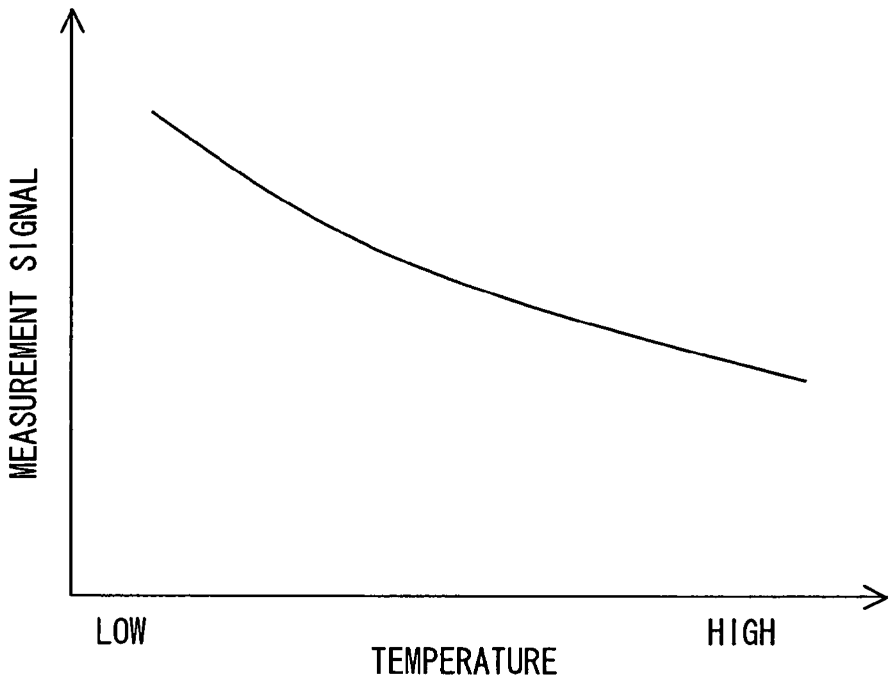
FIG. 5 is a diagram showing a measurement signal of the raindrop sensor in view of the temperature.

FIG. 5 indicates the temperature characteristic of the measurement signal induced by the luminance characteristic of the light emitting device 21 of the raindrop sensor 20. As shown in FIG. 5, in the case where the same quantity of raindrops is present in the sensing range Ad, when the temperature decreases, the measurement signal increases, and vice versa. Thus, in the state shown in FIGS. 6 and 7, the determining arrangement 44 cannot recognize the difference in the rainfalls shown in FIGS. 6 and 7 unless the temperature of the raindrop sensor 20 is sensed. Here, it should be noted that the same assumption as that of FIG. 3 described above is applied to FIGS. 6 and 7.

Figure 6:
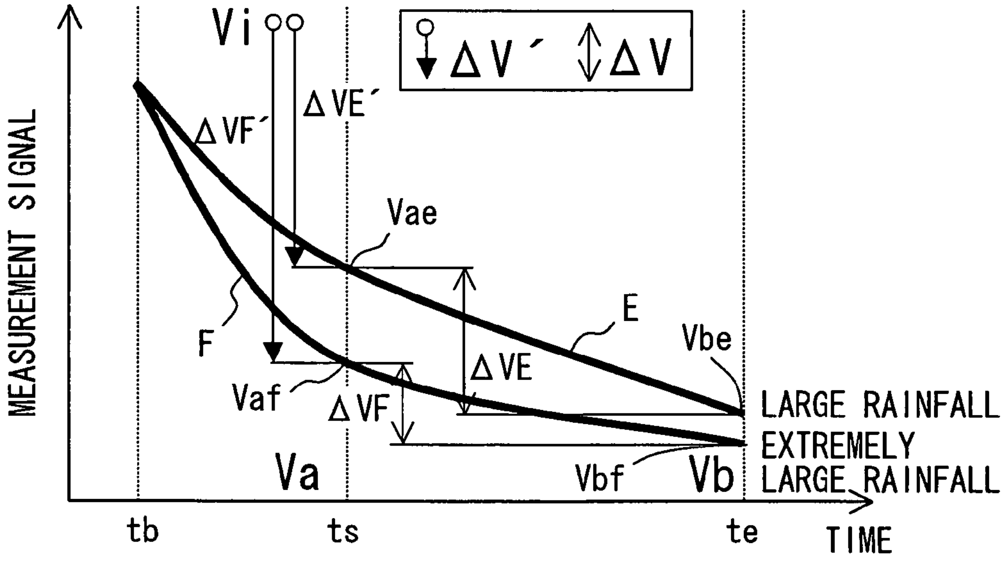
FIG. 6 is a diagram showing a measurement signal of the raindrop sensor in view of time for each of a large rainfall and an extremely large rainfall.

FIG. 6 shows both the shift of the measurement signal of the raindrop sensor 20 with time in the large rainfall and the shift of the measurement signal of the raindrop sensor 20 with time in the extremely large rainfall at the same temperature (common temperature) of the raindrop sensor 20.

As shown in FIG. 6, at the time of large rainfall, the measurement signal of the raindrop sensor 20 may shift in a manner shown with a curve E. Here, the measurement signal of the raindrop sensor 20 shows the largest value right after the time tb, which is right after the wiping of the sensing range Ad by the wiper blade 10, and then gradually decreases with time.

In contrast, at the time of extremely large rainfall, the measurement signal of the raindrop sensor 20 may shift in a manner shown with a curve F. The measurement signal of the raindrop sensor 20 shows the largest value right after the time tb, at which the sensing range Ad is wiped. Thereafter, the entire surface area of the sensing range Ad is quickly covered with the large quantity of raindrops before the time ts, which is the beginning of the raindrop quantity sensing execution time period. Thus, the measurement signal of the raindrop sensor 20 is rapidly decreased. Then, although the raindrops are continuously applied to the sensing range Ad even after the time ts, the amount of light, which is outputted from the light emitting device 21 and penetrates through the windshield W cannot increase largely. Therefore, the measurement signal of the raindrop sensor 20 is gradually decreased.

As clearly understood through comparison of the curve E and the curve F of FIG. 6, the measurement signal of the raindrop sensor 20 indicated by the curve E and the measurement signal of the raindrop sensor 20 indicated by the curve F at the time ts have a relationship of Vae>Vaf. Then, the measurement signal of the raindrop sensor 20 indicated by the curve E and the measurement signal of the raindrop sensor 20 indicated by the curve F at the time te have a relationship of Vbe>Vbf. Furthermore, the amount of change ΔVE is obtained by subtracting the measurement signal Vbe from the measurement signal Vae to indicate the amount change in the measurement signal of the raindrop sensor 20 for the curve E in the raindrop quantity sensing execution time period. Also, the amount of change ΔVF is obtained by subtracting the measurement signal Vbf from the measurement signal Vaf to indicate the amount of change in the measurement signal of the raindrop sensor 20 for the curve F in the raindrop quantity sensing execution time period. The amount of change ΔVE and the amount of change ΔVF, show a relationship of ΔVE>ΔVF, as clearly understood through the comparison of the curve E and the curve F of FIG. 6.

Furthermore, the difference ΔVE' is obtained by subtracting the measurement signal Vae of the raindrop sensor 20 from the reference value Vi, which is the measurement signal of the raindrop sensor 20 in the absence of raindrop(s) in the sensing range Ad and is measured at the generally the same temperature as that of the time of obtaining the measurement signal Vae. Also, the difference ΔVF' is obtained by subtracting the measurement signal Vaf of the raindrop sensor 20 from the reference value Vi, which is the measurement signal of the raindrop sensor 20 in the absence of raindrop(s) in the sensing range Ad and is measured at the generally the same temperature as that of the time of obtaining the measurement signal Vaf. The difference ΔVE' and the difference ΔVF' show a relationship of ΔVE'<ΔVF', as clearly understood through the comparison of the curve E and the curve F of FIG. 6.

Here, it is assumed that the rainfall has shifted from the large rainfall to the heavily large rainfall without changing the temperature. Under this circumstance, due to the shifting from ΔVE to ΔVF, the amount of change ΔV shows the decreasing tendency. Furthermore, due to the shifting from ΔVE' to ΔVF', the difference ΔV' shows the increasing tendency.

Figure 7:
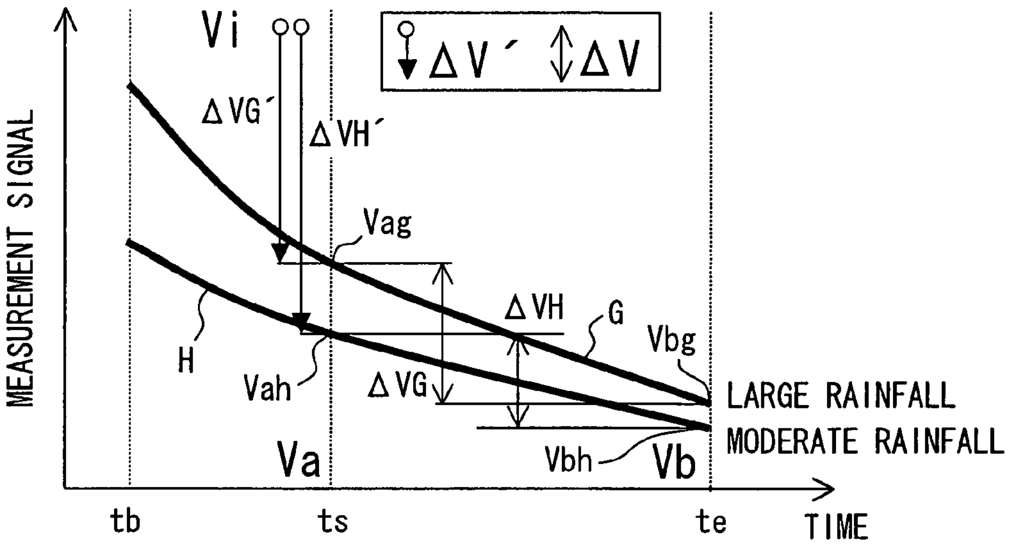
FIG. 7 is a diagram showing a measurement signal of the raindrop sensor in view of time for each of a large rainfall and a moderate rainfall.

FIG. 7 shows both the shift of the measurement signal of the raindrop sensor 20 with time in the large rainfall at a specific temperature of the raindrop sensor 20 and the shift of the measurement signal of the raindrop sensor 20 with time in the moderate rainfall at a higher temperature of the raindrop sensor 20, which is higher than the above specific temperature of the raindrop sensor 20.

As shown in FIG. 7, at the time of large rainfall, the measurement signal of the raindrop sensor 20 may shift in a manner shown with a curve G. Here, the measurement signal of the raindrop sensor 20 shows the largest value right after the time tb, which is right after the wiping of the sensing range Ad by the wiper blade 10, and then gradually decreases with time. In a state where the moderate rainfall exits at the temperature of the raindrop sensor 20, which is the same as that of the raindrop sensor 20 at the time of obtaining the curve G, the measurement signal of the raindrop sensor 20 right after the time tb of the wiping of the sensing range Ad is the same as the measurement signal of the raindrop sensor 20 at the time tb indicated by the curve G. Furthermore, in this state, the quantity of raindrops applied in the sensing range Ad per unit time is decreased, so that the measurement signal of the raindrop sensor 20 is increased in comparison to that of the curve G.

In contrast, in the different state where the moderate rainfall exits at the temperature of the raindrop sensor 20, which is higher than that of the raindrop sensor 20 at the time of obtaining the curve G, the measurement signal of the raindrop sensor 20 may shift in a manner shown with a curve H. Specifically, the measurement signal of the raindrop sensor 20 right after the time tb of the wiping of the sensing range Ad indicated by the curve H is substantially decreased in comparison to the measurement signal of the raindrop sensor 20 at the time tb indicated by the curve G due to the increase in the temperature of the raindrop sensor 20. Furthermore, although the quantity of raindrops applied in the sensing range Ad per unit time is decreased, the measurement signal of the raindrop sensor 20 is decreased in comparison to that of the curve G due to the temperature increase of the raindrop sensor 20.

As clearly understood through comparison of the curve G and the curve H of FIG. 7, the measurement signal of the raindrop sensor 20 indicated by the curve G and the measurement signal of the raindrop sensor 20 indicated by the curve H at the time ts have a relationship of Vag>Vah. Then, the measurement signal of the raindrop sensor 20 indicated by the curve G and the measurement signal of the raindrop sensor 20 indicated by the curve H at the time te have a relationship of Vbg>Vbh. Furthermore, the amount of change ΔVG is obtained by subtracting the measurement signal Vbg from the measurement signal Vag to indicate the amount change in the measurement signal of the raindrop sensor 20 for the curve G in the raindrop quantity sensing execution time period. Also, the amount of change ΔVH is obtained by subtracting the measurement signal Vbh from the measurement signal Vah to indicate the amount of change in the measurement signal of the sensor 20 for the curve H in the raindrop quantity sensing execution time period. The amount of change ΔVG and the amount of change ΔVH, show a relationship of ΔVG>ΔVH, as clearly understood through the comparison of the curve G and the curve H of FIG. 7.

Furthermore, the difference ΔVG' is obtained by subtracting the measurement signal Vag of the raindrop sensor 20 from the reference value Vi, which is the measurement signal of the raindrop sensor 20 in the absence of raindrop(s) in the sensing range Ad and is measured at the generally the same temperature as that of the time of obtaining the measurement signal Vag. Also, the difference ΔVH' is obtained by subtracting the measurement signal Vah of the raindrop sensor 20 from the reference value Vi, which is the measurement signal of the raindrop sensor 20 in the absence of raindrop(s) in the sensing range Ad and is measured at the generally the same temperature as that of the time of obtaining the measurement signal Vah. The difference ΔVH' and the difference ΔVG' show a relationship of ΔVH'>ΔVG', as clearly understood through the comparison of the curve G and the curve H of FIG. 7.

Here, it is assumed that the rainfall has shifted from the large rainfall to the moderate rainfall along with the substantial temperature increase of the raindrop sensor 20. This type of temperature change can be easily induced by, for example, operation of an air conditioning system of the vehicle. Under this circumstance, due to the shifting from ΔVG to ΔVH, the amount of change ΔV shows the decreasing tendency. Furthermore, due to the shifting from ΔVG' to ΔVH', the difference ΔV' shows the increasing tendency.

Therefore, the determining arrangement 44 cannot distinguish the increasing/decreasing tendency in the amount of change ΔV and the increasing/decreasing tendency in the difference ΔV' in the case of FIG. 6, in which the rainfall changes from the large rainfall to the extremely lager rainfall without the temperature change of the raindrop sensor 20, from the increasing/decreasing tendency in the amount of change ΔV and the increasing/decreasing tendency in the difference ΔV' in the case of FIG. 7, in which the rainfall changes from the large rainfall to the moderate rainfall along with the temperature increase of the raindrop sensor 20.

Therefore, according to the present embodiment, first, the temperature compensating arrangement 46 obtains the information of the temperature at the time of obtaining the measurement signal of the raindrop sensor 20 and the information of the temperature characteristic of the measurement signal of the raindrop sensor 20 from the thermistor 25 and the storage arrangement 45. Then, the temperature compensating arrangement 46 temperature compensates the reference value Vi in such a manner that the reference value Vi is adjusted to a value that is supposed to be obtained or achieved under the same temperature as the temperature, at which the measurement signal Va of the raindrop sensor 20 at the beginning of the raindrop quantity sensing execution time period and the measurement signal Va of the raindrop sensor 20 at the end of the raindrop quantity sensing execution time period are obtained.

Figure 8:
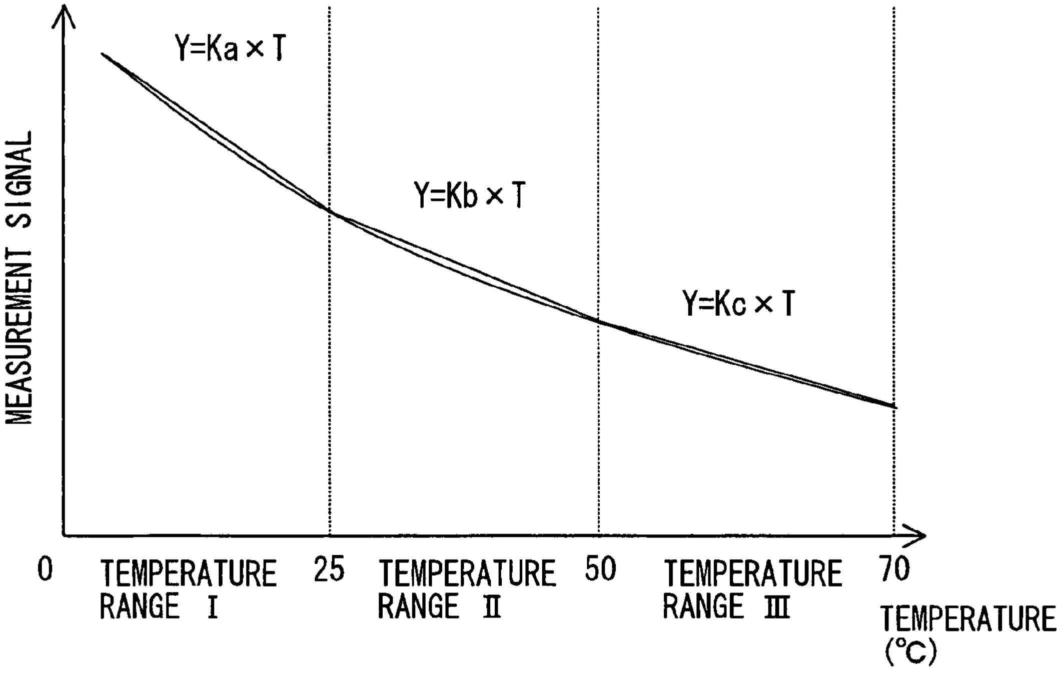
FIG. 8 is a diagram showing a measurement signal in view of the temperature upon linear approximation of the measurement signal in respective temperature ranges.

FIG. 8 shows an example of the temperature characteristic of the measurement signal of the raindrop sensor 20 stored in the storage arrangement 45. In FIG. 8, the measurement signal of the raindrop sensor 20 shown in FIG. 5 is linearly approximated at respective temperature ranges I to III. The storage arrangement 45 stores gradients Ka to Kc of the linearly approximated measurement signal at the temperature ranges I to III, respectively.

The temperature compensating arrangement 46 obtains the temperature Ti at the time of obtaining the reference value Vi, the temperature Ta at the time of obtaining the measurement signal Va and the temperature Tb at the time of obtaining the measurement signal Vb. Then, the temperature compensating arrangement 46 temperature compensates the reference value Vi based on the following equation (1) or equation (2).

In a case where the temperature Ta at the time of obtaining the measurement signal Va and the temperature Tb at the time of obtaining the measurement signal Vb are in the temperature range I (0 to 25 degrees Celsius), the temperature compensating arrangement 46 computes a corrected value Vi' based on the reference value Vi and the following equation (1). Then, the temperature compensating arrangement 46 computes the difference ΔV' based on the corrected value Vi'.

$$Vi' = Vi + Kc \times (Ti - 51) + Kb \times (50 - 25) + Ka \times (25 - Ta) \qquad \text{Equation 1}$$

Alternatively, in a case where the temperature Ta at the time of obtaining the measurement signal Va and the temperature Tb at the time of obtaining the measurement signal Vb are in the temperature range II (26 to 50 degrees Celsius), the temperature compensating arrangement 46 computes a corrected value Vi' based on the reference value Vi and the following equation (2). Then, the temperature compensating arrangement 46 computes the difference ΔV' based on the corrected value Vi'.

$$Vi' = Vi + Kc\times(Ti-51) + Kb\times(50-Ta) \quad \text{Equation 2}$$

When the reference value Vi is temperature compensated in the above described manner with a relatively, low computing load, the extremely large quantity of raindrops on the surface of the windshield W of the vehicle C can be appropriately determined even when the temperature of the raindrop sensor 20 is changed through the operation of the air conditioning system.

Figure 9A:
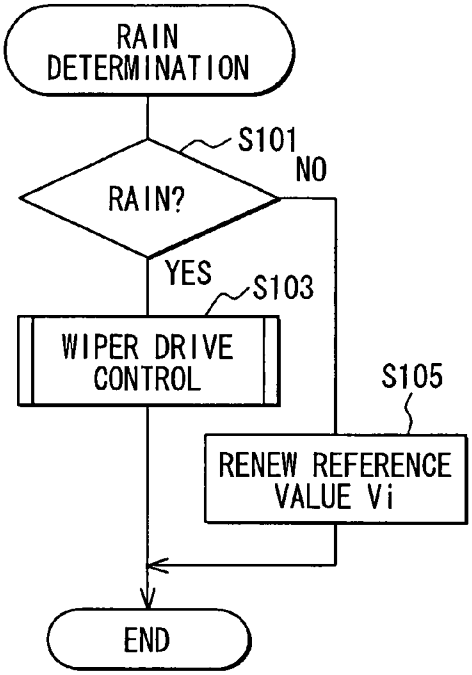
FIG. 9A is a flowchart showing a rain determination operation according to the embodiment.
Figure 9B:
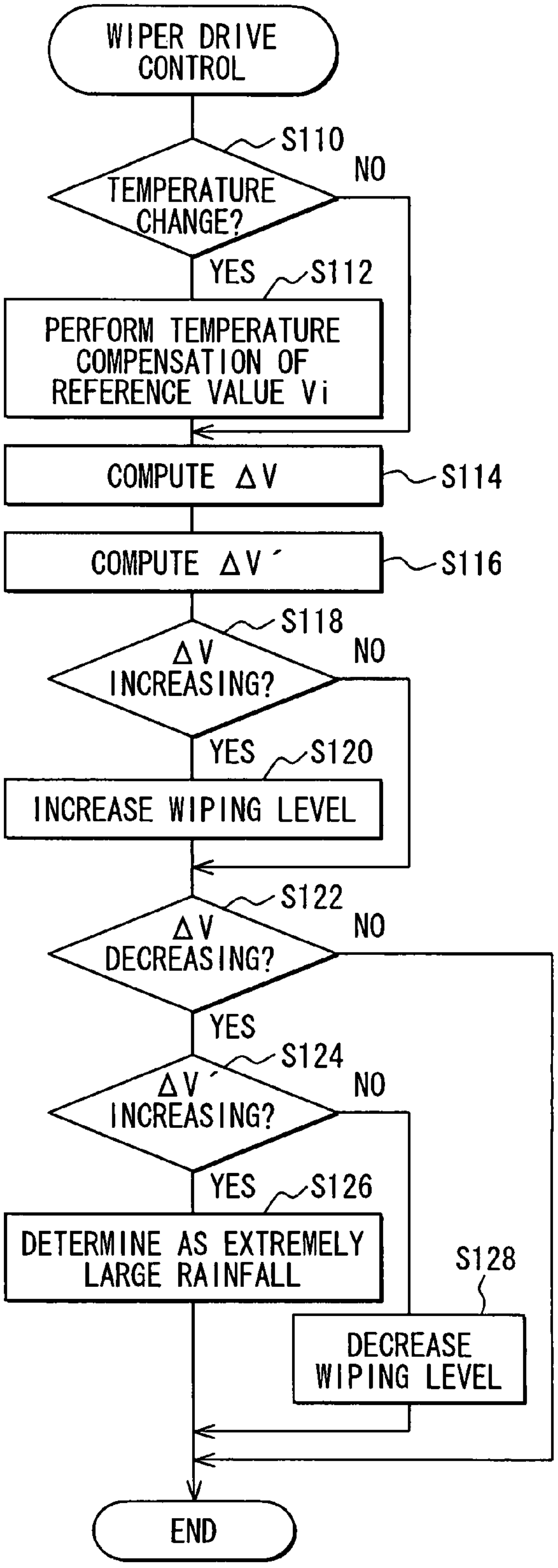
FIG. 9B is a flowchart showing a wiper drive control operation according to the embodiment.

FIG. 9A shows a flowchart of a rain determination operation, which is executed by the determining arrangement 44. FIG. 9B shows a flowchart of a wiper drive control operation, which is mainly executed by the determining arrangement 44. The operation of the raindrop quantity sensing apparatus and the wiper control system will be described with reference to FIGS. 9A and 9B.

When the user selects the AUTO mode through the manual operation of the wiper switch 30, the rain determination operation of FIG. 9A is started. When the rain determination operation is started, the determining arrangement 44 determines whether rain exists at step S101.

Specifically, when the AUTO mode is selected, the determining arrangement 44 obtains the measurement signal of the raindrop sensor 20 at predetermined time intervals (e.g., 0.5 milliseconds). Then, when the current measurement signal of the raindrop sensor 20 is smaller than the previous measurement signal of the raindrop sensor 20 by more than a predetermined amount, the determining arrangement 44 determines that the quantity of raindrops in the sensing range Ad is equal to or larger than a predetermined quantity and thereby determines that the rain exists (i.e., YES at step S101). Then, the determining arrangement 44 executes the wiper drive control operation shown in FIG. 9B at step S103. The wiper drive control operation will be described latter. The above predetermined quantity is selected according to a degree of the previous measurement signal of the raindrop sensor 20.

In contrast, when the current measurement signal of the raindrop sensor 20 is not smaller than the previous measurement signal of the raindrop sensor 20 by more than the predetermined amount, the determining arrangement 44 determines that the quantity of raindrops in the sensing range Ad is not equal to or larger than the predetermined quantity and thereby determines that the rain does not exist (i.e., NO at step S101). Thereafter, at step S105, the determining arrangement 44 stores the current measurement signal of the raindrop sensor 20 as the reference value Vi in the storage arrangement 45 to renew the previously stored reference value Vi. When the reference value Vi is renewed in the above described manner, the reference value Vi is kept renewed right before the starting of the rain. Furthermore, at this time, the determining arrangement 44 also obtains the information of the temperature of the raindrop sensor 20 from the thermistor 25 and stores this temperature as the temperature Ti in the storage arrangement 45. When the renewal of the reference value Vi is completed, the determining arrangement 44 terminates the current operation.

Next, the wiper drive control operation shown in FIG. 9B will be described. Upon starting of the wiper drive control operation, at step S110, the determining arrangement 44 determines whether a change in the temperature of the raindrop sensor 20 exists based on information supplied from the temperature compensating arrangement 46. Specifically, the determining arrangement 44 determines whether the temperature of the raindrop sensor 20, which is sensed with the thermistor 25, shows a substantial change that is equal to or larger than a predetermined amount. When it is determined that the temperature of the raindrop sensor 20 shows the substantial change that is equal to or larger than the predetermined amount at step S110 (i.e., YES at step S110), the determining arrangement 44 proceeds to step S112. At step S112, the determining arrangement 44 commands the temperature compensating arrangement 46 to perform the temperature compensation of the reference value Vi. Then, when the temperature compensation of the reference value Vi is terminated or when it is determined that the temperature of the raindrop sensor 20 does not show the substantial change that is equal to or larger than the predetermined amount at step S110 (i.e., NO at step S110), the determining arrangement 44 proceeds to step S114.

Next, at step S114, the determining arrangement 44 commands the change computing arrangement 42 to compute the amount of change in the measurement signal of the raindrop sensor 20 by subtracting the measurement signal Vb (last measured value of the measurement signal) of the raindrop sensor 20 at the end of the raindrop quantity sensing execution time period from the measurement signal Va (initial measured value of the measurement signal) of the raindrop sensor at the beginning of the raindrop quantity sensing execution time period.

Furthermore, at step S116, the determining arrangement 44 commands the difference computing arrangement 43 to compute the difference ΔV' by subtracting the measurement signal Va from the reference value Vi or the corrected value Vi' thereof stored in the storage arrangement 45.

Then, at step S118, the determining arrangement 44 determines whether the amount of change ΔV, which is obtained by the change computing arrangement 42 at step S114, shows the increasing tendency of more than the predetermined amount, i.e., is increased by more than the predetermined amount from the previous one or any past one obtained in the previous or past raindrop quantity sensing execution time period. Here, when it is determined that the amount of change ΔV shows the increasing tendency of more than the predetermined amount at step S118 (i.e., YES at step S118), the determining arrangement 44 commands the wiper control arrangement 41 to increase the wiping level by one (one step higher). Here, the initial wiping level may be the intermittent drive operation at the long intermittent time interval. Then, when the wiping level of the wiper blades 10 is increased by one through the wiper control arrangement 41, or when it is determined that the amount of change ΔV does not show the increasing tendency of more than the predetermined amount at step S118 (i.e., NO at step S118, the determining arrangement 44 proceeds to step S122.

Then, at step S122, the determining arrangement 44 determines whether the amount of change ΔV, which is obtained by the change computing arrangement 42 at step S114, shows the decreasing tendency of more than the predetermined amount, i.e., is decreased by more than the predetermined amount from the previous one or any past one obtained in the previous or past raindrop quantity sensing execution time period. When it is determined that the amount of change ΔV shows the decreasing tendency of more than the predetermined amount at step S122 (i.e, YES at step S122), the determining arrangement 44 proceeds to step S124. At step S124, the determining arrangement 44 determines whether the difference ΔV', which is computed by the difference computing arrangement 43, shows the increasing tendency of more than the predetermined amount, i.e., is increased by more than the predetermined amount. When it is determined that the difference ΔV' shows the increasing tendency of more than the predetermined amount at step S124 (i.e., YES at step S124), the determining arrangement 44 proceeds to step S126. At step S126, the determining arrangement 44 determines that the quantity of raindrops in the sensing range Ad is extremely large. Here, the determining arrangement 44 commands the wiper control arrangement 41 to forcefully change the current wiping level to the continuous drive operation at the wiping speed set for the HI mode.

In contrast, when it is determined that the difference ΔV' does not show the increasing tendency of more than the predetermined amount at step S124 (i.e., NO at step S124), the determining arrangement 44 proceeds to step S128. At step S128, the determining arrangement 44 commands the wiper control arrangement 41 to lower the wiping level by one (one step lower). When it is determined that the amount of change ΔV does not show the decreasing tendency of more than the predetermined amount at step S122 (i.e., NO at step S122), the determining arrangement 44 terminates the current operation.

The present invention is not limited to the above embodiment, and the above embodiment may be modified as follows.

Figure 10A:
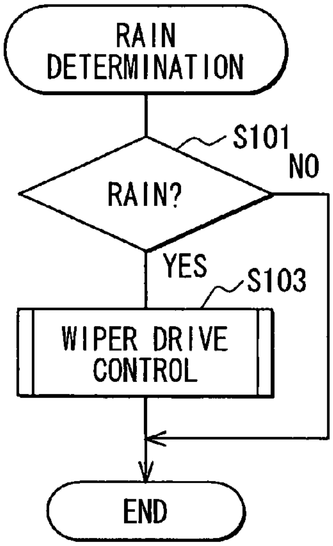
FIG. 10A is a flowchart showing a modification of the rain determination operation of FIG. 9A.

In the above embodiment, the measurement signal of the raindrop sensor 20, which is obtained upon the determining of the absence of raindrop(s), is obtained as the reference value Vi to renew the previous reference value Vi (step S105 in FIG. 9A). Alternatively, as shown in FIG. 10A, which is a modification of FIG. 9A, the step of renewing the reference value Vi may be eliminated.

In the above embodiment, the thermistor 25 (FIG. 2) is used as the temperature sensing means for sensing the temperature of the raindrop sensor 20. However, the temperature sensing means is not limited to the thermistor 25. Any other appropriate device may be used as the temperature sensing means.

In the above embodiment, the gradients Ka to Kc of the linearly approximated measurement signal at the temperature ranges I to III are stored in the storage arrangement 45 as the information of the temperature characteristic of the measurement signal of the raindrop sensor 20 (FIG. 8). However, the present invention is not limited to this. For example, a map, which indicates the relationship (e.g. the relationship of FIG. 8) between the measurement signal and the temperature, may be stored in the storage arrangement 45. That is, it is only required to store the information, which is required to perform the temperature compensation.

In the above embodiment (as well as the above modifications), the temperature compensation is performed on the reference value Vi, as discussed at step S112 of FIG. 9B. Alternatively, each of the measurement signals Va, Vb may be temperature compensated to a corresponding value, which is supposed to be obtained at the temperature that is the same as the temperature measured at the time of obtaining the reference value Vi. That is, it is only required to perform the temperature compensation to make the reference value Vi and the measurement signals Va, Vb obtained under the same temperature condition.

Figure 10B:
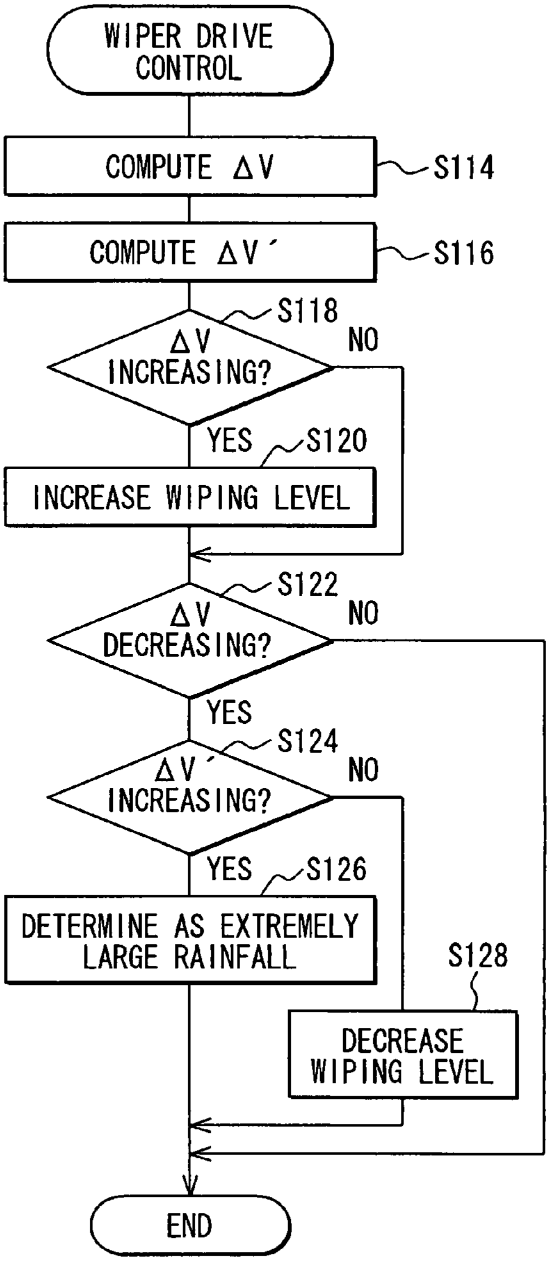
FIG. 10B is a flowchart showing a modification of the wiper drive control operation of FIG. 9B.

In the above embodiment (as well as the above modifications), as discussed with respect to step S110 of FIG. 9B, when it is determined that the temperature of the raindrop sensor 20, which is sensed with the thermistor 25, shows the substantial change that is equal to or larger than the predetermined amount, the temperature compensation is performed at step S112. However, the present invention is not limited to this. For example, in a case where a change in the temperature the raindrop sensor 20 does not occur frequently, this may be modified as follows. That is, when a change in the temperature of the raindrop sensor 20 beyond the predetermined amount occurs more than a predetermined number of times, the temperature compensation may be performed at step S112. Furthermore, as shown in FIG. 10B, which a modification of FIG. 9B, steps S110, S112 of FIG. 9B may be eliminated.

In the above embodiment (as well as the above modifications), the measurement signal of the raindrop sensor 20, which is outputted at the time of absence of raindrop(s) in the sensing range Ad of the raindrop sensor 20, is, used as the reference value Vi. However, the reference value Vi may be modified to any other appropriate value, which does not relate to the current quantity of raindrops in the sensing range Ad. Therefore, it is possible to determine whether the quantity of raindrops in the sensing range Ad is extremely large based on the increasing/decreasing tendency of the amount change ΔV and the increasing/decreasing tendency of the difference ΔV' in view of the newly adapted reference value Vi.

In the above embodiment (as well as the above modifications), the quantity of raindrops on the windshield W is determined based on the increasing/decreasing tendency of the amount of change computed by the change computing arrangement 42 and the increasing/decreasing tendency of the difference computed by the difference computing arrangement 43. However, the present invention is not limited to this. For example, it is possible to determine the quantity of raindrops on the windshield based on the amount of change, which is computed by the change computing arrangement 42, and the difference, which is computed by the difference computing arrangement 43. Specifically, multiple thresholds may be preset with respect to the amount of change, which is computed by the change computing arrangement 42. Then, the quantity of raindrops on the windshield may be determined based on an approaching state to the corresponding one of the thresholds and the difference. In this way, the quantity of raindrops on the windshield W can be determined based on the information, which is obtained in the single raindrop quantity sensing execution time period.

In the above embodiment (as well as the above modifications), the raindrop quantity sensing apparatus and the wiper control system are installed in the automobile. However, the raindrop quantity sensing apparatus and the wiper control system described above may be installed to any other vehicle. Such a vehicle may include an airplane, a train or the like.

Additional advantages and modifications will readily occur to those skilled in the art. The invention in its broader terms is therefore not limited to the specific details, representative apparatus, and illustrative examples shown and described.

What is claimed is:

1. A raindrop quantity sensing apparatus comprising:

a raindrop sensor that outputs a measurement signal, which corresponds to a quantity of raindrops in a predetermined area in a wiping range of a wiper blade on a windshield;

a change computing means for computing an amount of change in a measured value of the measurement signal of the raindrop sensor in a raindrop quantity sensing execution time period, wherein the change computing means sets a time period, during which the wiper blade moves in a sensing range of the raindrop sensor, as a raindrop quantity sensing prohibited time period, and the change computing means sets a time period, during which the wiper blade moves outside of the sensing range, as a raindrop quantity sensing execution time period:

a difference computing means for computing a difference between a predetermined reference value and an initial measured value of the measurement signal of the raindrop sensor, wherein the initial measured value of the measurement signal of the raindrop sensor is measured at a beginning of the raindrop quantity sensing execution time period; and a determining means for determining the quantity of raindrops on the windshield based on the amount of change, which is computed by the change computing means, and the difference, which is computed by the difference computing means:

wherein the determining means determines the quantity of raindrops on the windshield based on:

an increasing tendency or decreasing tendency of the amount of change, which is computed by the change computing means; and an increasing tendency or decreasing tendency of the difference, which is computed by the difference computing means.

2. The raindrop quantity sensing apparatus according to claim 1, wherein a measured value of the measurement signal of the raindrop sensor, which is outputted from the raindrop sensor when no raindrop is present in the sensing range, is set as the predetermined reference value.

3. The raindrop quantity sensing apparatus according to claim 1, further comprising a renewing means for renewing the predetermined reference value when no raindrop is present in the sensing range.

4. A wiper control system comprising:

the raindrop quantity sensing apparatus recited in claim 1;

a wiper motor that drives the wiper blade; and a wiper control means for controlling a wiping operation of the wiper blade according to the quantity of raindrops on the windshield, which is determined by the raindrop quantity sensing apparatus.

5. A raindrop quantity sensing apparatus comprising:

a raindrop sensor that outputs a measurement signal, which corresponds to a quantity of raindrops in a predetermined area in a wiping range of a wiper blade on a windshield;

a change computing means for computing an amount of change in a measured value of the measurement signal of the raindrop sensor in a raindrop quantity sensing execution time period, wherein the change computing means sets a time period, during which the wiper blade moves in a sensing range of the raindrop sensor, as a raindrop quantity sensing prohibited time period, and the change computing means sets a time period, during which the wiper blade moves outside of the sensing range, as a raindrop quantity sensing execution time period;

a difference computing means for computing a difference between a predetermined reference value and an initial measured value of the measurement signal of the raindrop sensor, wherein the initial measured value of the measurement signal of the raindrop sensor is measured at a beginning of the raindrop quantity sensing execution time period; and a determining means for determining the quantity of raindrops on the windshield based on the amount of change, which is computed by the change computing means, and the difference, which is computed by the difference computing means;

wherein a measured value of the measurement signal of the raindrop sensor, which is outputted from the raindrop sensor when no raindrop is present in the sensing range, is set as the predetermined reference value;

the determining means determines that the quantity of raindrops on the windshield is an extremely large quantity, which is greater than a predetermined quantity, when the following two conditions are both satisfied:

the amount of change, which is computed by the change computing means, shows a decreasing tendency; and the difference, which is computed by the difference computing means, shows an increasing tendency.

6. The raindrop quantity sensing apparatus according to claim 5, wherein a quantity of raindrops, which corresponds to a lower limit value of the measurement signal that is suppliable from the raindrop sensor, is set as the predetermined quantity.

7. A wiper control system comprising:

the raindrop quantity sensing apparatus recited in claim 5;

a wiper motor that drives the wiper blade; and a wiper control means for controlling a wiping operation of the wiper blade according to the quantity of raindrops on the windshield, which is determined by the raindrop quantity sensing apparatus.

8. A raindrop quantity sensing apparatus comprising:

a raindrop sensor that outputs a measurement signal, which corresponds to a quantity of raindrops in a predetermined area in a wiping range of a wiper blade on a windshield;

a change computing means for computing an amount of change in a measured value of the measurement signal of the raindrop sensor in a raindrop quantity sensing execution time period, wherein the change computing means sets a time period, during which the wiper blade moves in a sensing range of the raindrop sensor, as a raindrop quantity sensing prohibited time period, and the change computing means sets a time period, during which the wiper blade moves outside of the sensing range, as a raindrop quantity sensing execution time period;

a difference computing means for computing a difference between a predetermined reference value and an initial measured value of the measurement signal of the raindrop sensor, wherein the initial measured value of the measurement signal of the raindrop sensor is measured at a beginning of the raindrop quantity sensing execution time period; and a determining means for determining the quantity of raindrops on the windshield based on the amount of change, which is computed by the change computing means, and the difference, which is computed by the difference computing means;

wherein a measured value of the measurement signal of the raindrop sensor, which is outputted from the raindrop sensor when no raindrop is present in the sensing range, is set as the predetermined reference value;

the determining means determines that the quantity of raindrops on the windshield is increased when the amount of change, which is computed by the change computing means, shows an increasing tendency;

the determining means determines that the quantity of raindrops on the windshield is decreased when the following two conditions are both satisfied:

the amount of change, which is computed by the change computing means, shows a decreasing tendency; and the difference, which is computed by the difference computing means, shows a decreasing tendency; and the determining means determines that the quantity of raindrops on the windshield is an extremely large quantity, which is greater than a predetermined quantity, when the following two conditions are both satisfied:

the amount of change, which is computed by the change computing means, shows a decreasing tendency; and the difference, which is computed by the difference computing means, shows an increasing tendency.

9. A wiper control system comprising:

the raindrop quantity sensing apparatus recited in claim 8;

a wiper motor that drives the wiper blade; and a wiper control means for controlling a wiping operation of the wiper blade according to the quantity of raindrops on the windshield, which is determined by the raindrop quantity sensing apparatus.

10. A raindrop quantity sensing apparatus comprising:

a raindrop sensor that outputs a measurement signal, which corresponds to a quantity of raindrops in a predetermined area in a wiping range of a wiper blade on a windshield;

a change computing means for computing an amount of change in a measured value of the measurement signal of the raindrop sensor in a raindrop quantity sensing execution time period, wherein the change computing means sets a time period, during which the wiper blade moves in a sensing range of the raindrop sensor, as a raindrop quantity sensing prohibited time period, and the change computing means sets a time period, during which the wiper blade moves outside of the sensing range, as a raindrop quantity sensing execution time period;

a difference computing means for computing a difference between a predetermined reference value and an initial measured value of the measurement signal of the raindrop sensor, wherein the initial measured value of the measurement signal of the raindrop sensor is measured at a beginning of the raindrop quantity sensing execution time period;

a determining means for determining the quantity of raindrops on the windshield based on the amount of change, which is computed by the change computing means, and the difference, which is computed by the difference computing means;

a temperature sensing means for sensing a temperature of the raindrop sensor;

a storage means for storing information of a temperature characteristic of the measurement signal outputted from the raindrop sensor; and a temperature compensating means for performing temperature compensation of at least one the predetermined reference value, an initial measured value of the measurement signal of the raindrop sensor and a last measured value of the measurement signal of the raindrop sensor based on the temperature, which is measured with the temperature sensing means, and the information of the temperature characteristic stored in the storage means, so that the at least one of the predetermined reference value, the initial measured value of the measurement signal of the raindrop sensor and the last measured value of the measurement signal of the raindrop sensor is corrected to a corresponding value that is supposed to be achieved at a common temperature of the raindrop sensor that is common to a temperature of the raindrop sensor, which is measured by the temperature sensing means at a time of measuring the rest of the predetermined reference value, the initial measured value of the measurement signal of the raindrop sensor and the last measured value of the measurement signal of the raindrop sensor, wherein the initial measured value of the measurement signal of the raindrop sensor is measured at the beginning of the raindrop quantity sensing execution time period, and the last measured value of the measurement signal of the raindrop sensor is measured at an end of the raindrop quantity sensing execution time period.

11. The raindrop quantity sensing apparatus according to claim 10, wherein:

the information of the temperature characteristic, which is stored in the storage means, includes a plurality of gradients of the measurement signal of the raindrop sensor, which are obtained at a plurality of predetermined temperature ranges, respectively, upon linear approximation of the measurement signal of the raindrop sensor at each of the plurality of predetermined temperature ranges; and the temperature compensating means corrects the at least one of the predetermined reference value, the initial measured value of the measurement signal of the raindrop sensor and the last measured value of the measurement signal of the raindrop sensor based on:

a difference between the temperature, which is measured with the temperature sensing means, and the common temperature; and the temperature gradient of each of the plurality of predetermined temperature ranges.

12. The raindrop quantity sensing apparatus according to claim 10, wherein the temperature compensating means corrects the at least one of the predetermined reference value, the initial measured value of the measurement signal and the last measured value of the measurement signal when an amount of change in the temperature, which is measured with the temperature sensing means, becomes greater than a predetermined amount.

13. A wiper control system comprising:

the raindrop quantity sensing apparatus recited in claim 10;

a wiper motor that drives the wiper blade; and a wiper control means for controlling a wiping operation of the wiper blade according to the quantity of raindrops on the windshield, which is determined by the raindrop quantity sensing apparatus.

* * * * *